United States Patent
Nishizawa et al.

(10) Patent No.: US 7,059,997 B2
(45) Date of Patent: Jun. 13, 2006

(54) ENGINE SYSTEM WITH CYLINDER NUMBER VARIABLE ENGINE AND METHOD FOR CONTROLLING THE ENGINE SYSTEM

(75) Inventors: Hiroyuki Nishizawa, Tajimi (JP); Masataka Osawa, Nagoya (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 141 days.

(21) Appl. No.: 10/910,570

(22) Filed: Aug. 4, 2004

(65) Prior Publication Data

US 2005/0049108 A1 Mar. 3, 2005

(30) Foreign Application Priority Data

Aug. 4, 2003 (JP) .............................. 2003-285799

(51) Int. Cl.
*B60K 1/02* (2006.01)
*B60W 10/04* (2006.01)

(52) U.S. Cl. .......................................... 477/3; 477/107
(58) Field of Classification Search .................... 477/3, 477/107, 110; 123/192.1, 198 F, 481
See application file for complete search history.

(56) References Cited

U.S. PATENT DOCUMENTS

| 5,540,633 | A | * | 7/1996 | Yamanaka et al. | ........... 477/107 |
| 5,685,800 | A | * | 11/1997 | Toukura | ....................... 477/90 |
| 6,306,056 | B1 | * | 10/2001 | Moore | ............................ 475/5 |
| 6,691,807 | B1 | | 2/2004 | Bhavsar et al. | |
| 6,994,069 | B1 | * | 2/2006 | Hasebe et al. | ........... 123/198 F |

FOREIGN PATENT DOCUMENTS

| JP | 57-176330 | 10/1982 |
| JP | 7-293288 | 11/1995 |
| JP | 2002-13423 | 1/2002 |
| JP | 2002-052940 | 2/2002 |

\* cited by examiner

*Primary Examiner*—Dirk Wright
(74) *Attorney, Agent, or Firm*—Oblon, Spivak, McClelland, Maier & Neustadt, P.C.

(57) ABSTRACT

An engine system includes an engine, continuously variable transmission and a controller. The engine has an engine shaft and plural cylinders. A number of activated cylinders among the plural cylinders is variable. The continuously variable transmission is configured to transmit a rotation of the engine shaft to wheels of a vehicle at a transmission ratio which is continuously variable. The controller is configured to control the engine to change the number of activated cylinders keeping an engine power generated by the engine to be substantially constant.

21 Claims, 16 Drawing Sheets

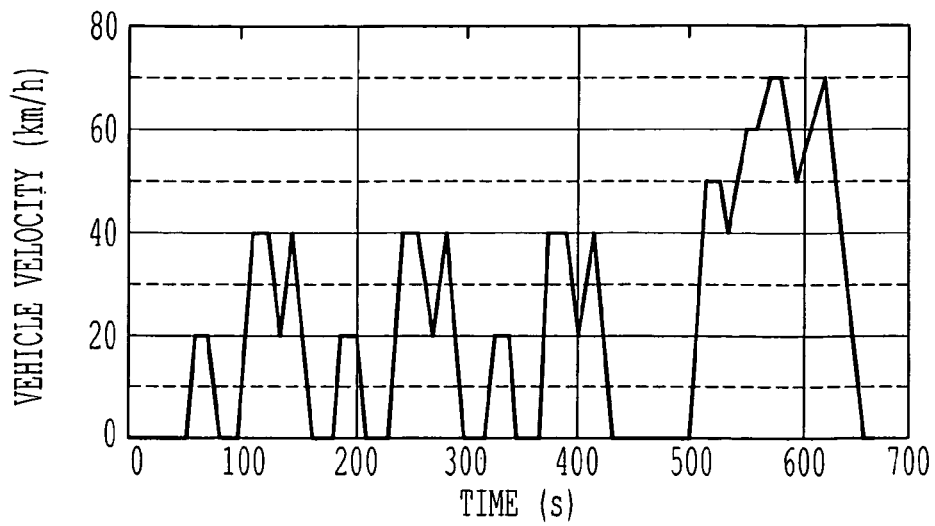
FIG. 5A 10.15 MODE VEHICLE VELOCITY PATTERN
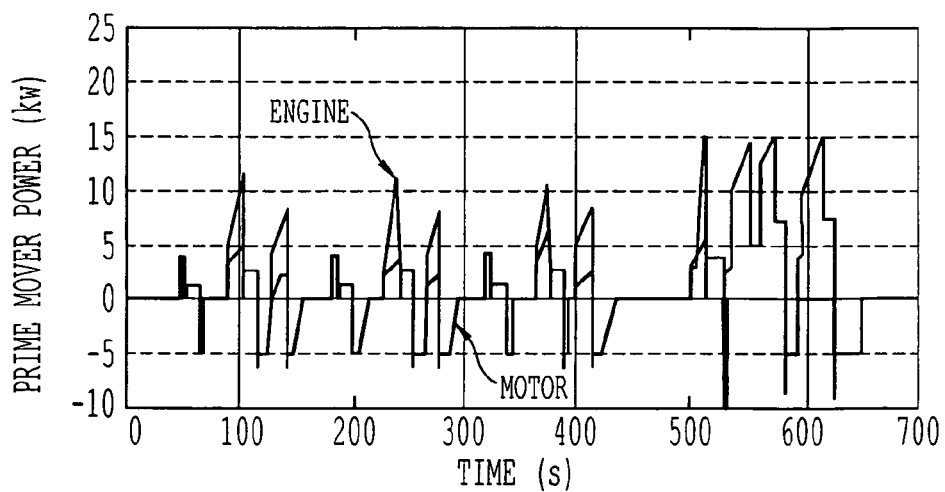
FIG. 5B 10.15 MODE PRIME MOVER POWER
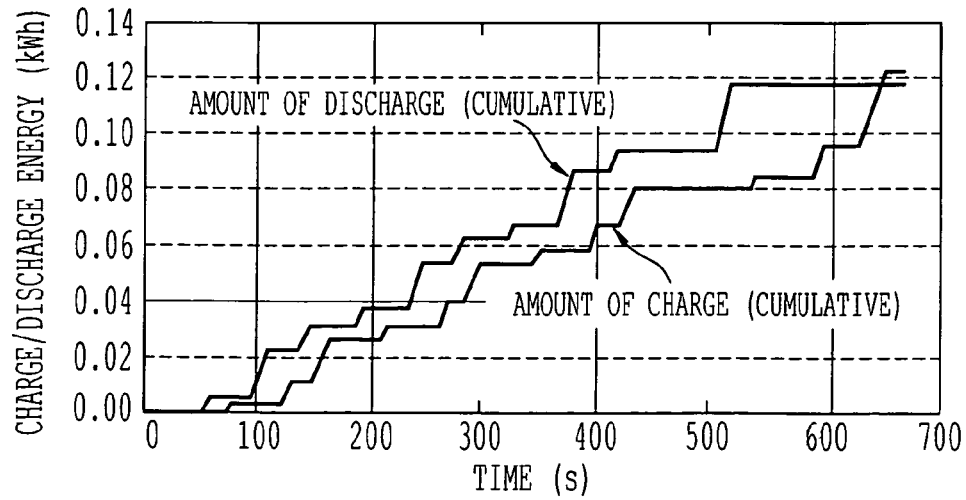
FIG. 5C 10.15 MODE BATTERY CHARGE/DISCHARGE BALANCE Pe < SWITCHING THRESHOLD (REDUCED-CYLINDER OPERATION)

Pe > SWITCHING THRESHOLD (ALL-CYLINDER OPERATION)

THE NUMBER OF ACTIVATED CYLINDERS IS BEING CHANGED

ENGINE SYSTEM WITH CYLINDER NUMBER VARIABLE ENGINE AND METHOD FOR CONTROLLING THE ENGINE SYSTEM

CROSS-REFERENCE TO RELATED APPLICATIONS

The present application claims priority under 35 U.S.C. §119 to Japanese Patent Application No. 2003-285799, filed Aug. 4, 2003, entitled "Engine System and Hybrid Vehicle." The contents of that application are incorporated herein by reference in their entirety.

BACKGROUND OF THE INVENTION

1. Field of the Invention

The present invention relates to an engine system, a method for controlling an engine system, and a vehicle including the engine system.

2. Discussion of the Background

FIG. 13 is a graph showing constant fuel-consumption contours and an optimum-fuel-consumption line of an engine of a vehicle. In FIG. 13, an area A corresponds to the state in which the vehicle is driven in an urban area. In the area A, a throttle opening is small and the engine efficiency is low. An area B corresponds to the state in which the vehicle is accelerating, and an area C corresponds to the state in which the vehicle is moving at high velocity.

In a hybrid vehicle, when the desired engine output is in the area A, the engine is actually operated in the area B due to an increase in the load to generate electric power. Alternatively, the engine is stopped and the vehicle is driven only by an electric motor. Thus, the engine is prevented from operating in the area A, where the engine efficiency is low.

In the case in which the hybrid vehicle is driven only by the electric motor in the area A, the electric motor is required a rated output of about one half of the vehicle's maximum output and a battery is required to be large enough to drive the vehicle in the area A by the electric motor. When such an electric motor is installed in the hybrid vehicle, the volume, weight, and cost of the vehicle increase.

In addition, in the hybrid vehicle, the generated electricity is first stored in the battery and the electric motor is driven by the electricity stored in the battery. Therefore, considering the efficiency of the electrical system (=generating efficiency×charging efficiency×discharging efficiency×driving efficiency of the electric motor), there may be a case in which the fuel consumption cannot be sufficiently reduced even when the vehicle is driven by the electric motor in the area A.

In addition, in the hybrid vehicle, the maximum engine output is reduced and the maximum output is obtained using both the engine and the electric motor. Therefore, when the hybrid vehicle is constantly driven under high-load conditions (for example, when the vehicle is pulling heavy loads or cruising at high velocity on a freeway), the vehicle will eventually be driven only by the engine because of the insufficient battery capacity. Accordingly, sufficient engine power cannot be obtained.

As one of the solutions for the above-described problems, a technique regarding a cylinder number variable engine in which the number of activated cylinders can be controlled has been suggested in, for example, Japanese Unexamined Patent Application Publication No. 2002-13423. The contents of this application are incorporated herein by reference in their entirety.

FIG. 14A is a graph showing an optimum-fuel-consumption line when a cylinder number variable engine performs an all-cylinder operation in which all of the cylinders are activated. FIG. 14B is a graph showing an optimum-fuel-consumption line when the cylinder number variable engine performs a reduced-cylinder operation in which some of all cylinders are activated. According to the technique described in Japanese Unexamined Patent Application Publication No. 2002-13423, the cylinder load is increased by causing the cylinder number variable engine to perform the reduced-cylinder operation, so that the operation of the area A would be performed in the area B, as shown in FIG. 14B, and the fuel consumption rate is improved. In addition, the all-cylinder operation is performed in the high-load areas (areas B and C) so that high-load operation can be performed continuously.

Japanese Unexamined Patent Application Publication No. 57-176330 discloses a technique for reducing the torque gap when the number of cylinders activated in the cylinder number variable engine is changed. The contents of this application are incorporated herein by reference in their entirety.

FIG. 15 is a graph of output torque versus throttle-valve opening in a 4-cylinder operation and a 2-cylinder operation. The engine speed is constant. According to the technique described in Japanese Unexamined Patent Application Publication No. 57-176330, the number of cylinders is changed at a throttle-valve opening corresponding to the intersection of the engine-torque lines corresponding to the all-cylinder operation and the reduced-cylinder operation, as shown in FIG. 15. Many cylinder number variable engines in practical use adopt this method for changing the number of cylinders.

Japanese Unexamined Patent Application Publication No. 7-293288 discloses a cylinder number variable engine in which the point at which the number of cylinders can be changed is not limited so that the effect of reducing fuel cost is enhanced. The contents of this application are incorporated herein by reference in their entirety.

According to the technique described in Japanese Unexamined Patent Application Publication No. 7-293288, a group of continuously activated cylinders and a group of cylinders which are stopped as necessary are provided with respective throttle valves, and the two throttle valves are operated in association with each other such that the torque gap does not occur when the number of cylinders is changed.

SUMMARY OF THE INVENTION

According to one aspect of the present invention, an engine system includes an engine, continuously variable transmission and a controller. The engine has an engine shaft and plural cylinders. A number of activated cylinders among the plural cylinders is variable. The continuously variable transmission is configured to transmit a rotation of the engine shaft to wheels of a vehicle at a transmission ratio which is continuously variable. The controller is configured to control the engine to change the number of activated cylinders keeping an engine power generated by the engine to be substantially constant.

According to another aspect of the present invention, a method for controlling an engine system includes transmitting a rotation of an engine shaft of an engine to wheels of a vehicle at a transmission ratio which is continuously variable. In this method, the engine is controlled to change a number of activated cylinders keeping an engine power generated by the engine to be substantially constant.

According to yet another aspect of the present invention, a vehicle includes an engine, continuously variable transmission and a controller. The engine has an engine shaft and plural cylinders. A number of activated cylinders among the plural cylinders is variable. The continuously variable transmission is configured to transmit a rotation of the engine shaft to wheels of a vehicle at a transmission ratio which is continuously variable. The controller is configured to control the engine to change the number of activated cylinders keeping an engine power generated by the engine to be substantially constant.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5A to 5C are graphs showing vehicle velocity, prime mover power, and battery charge/discharge balance, respectively, in the 10–15 mode cycle when a coefficient a is 3.6;

FIG. 6A shows the case in which an engine power Pe is smaller than a switching threshold Th, FIG. 6B shows the case in which the engine power Pe is larger than the switching threshold Th, and FIG. 6C shows the case in which the number of activated cylinders is being changed;

DESCRIPTION OF THE EMBODIMENTS

Figure 1:
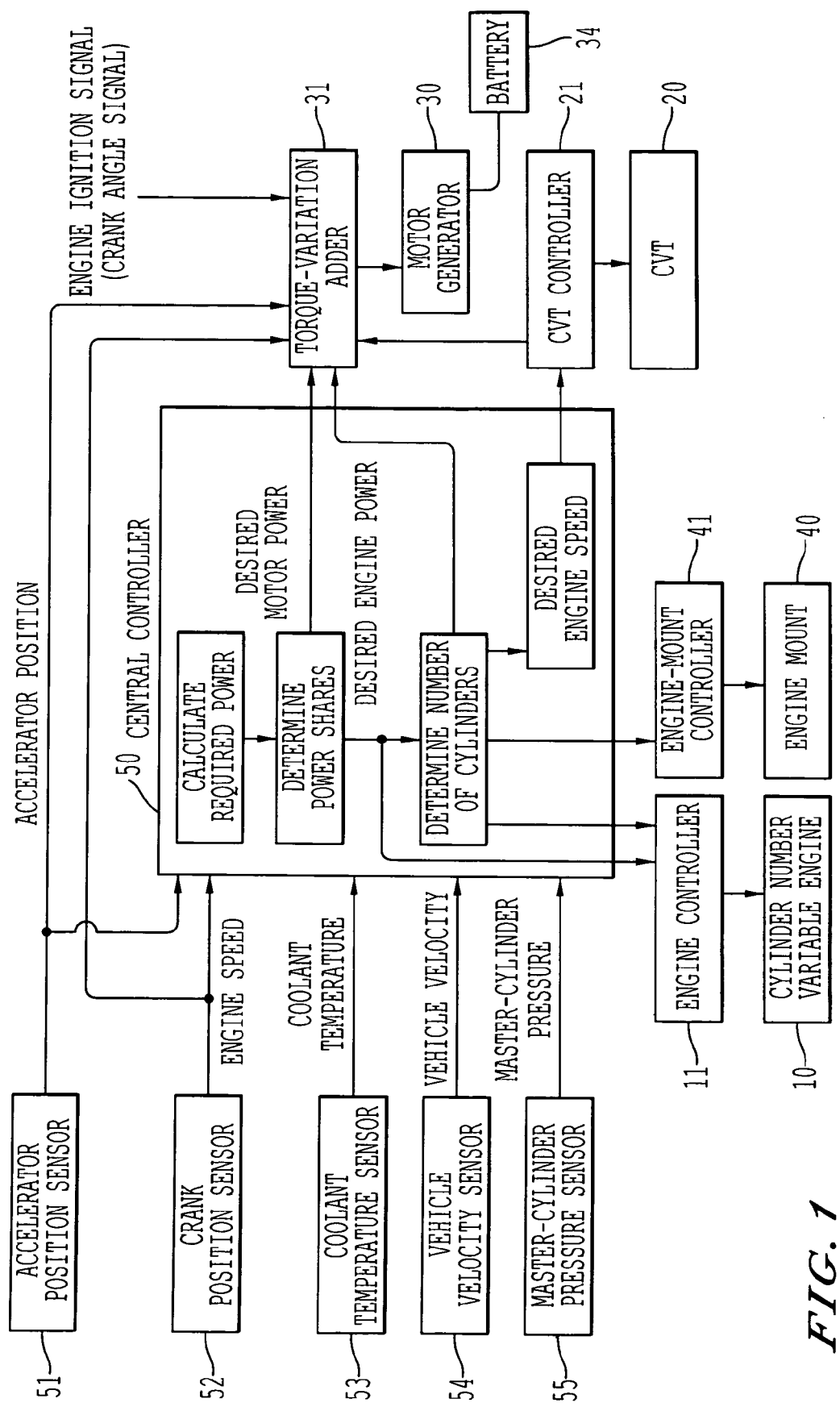
FIG. 1 is a block diagram showing the construction of an engine system according to an embodiment of the present invention.

The embodiments will now be described with reference to the accompanying drawings, wherein like reference numerals designate corresponding or identical elements throughout the various drawings.

Figure 16:
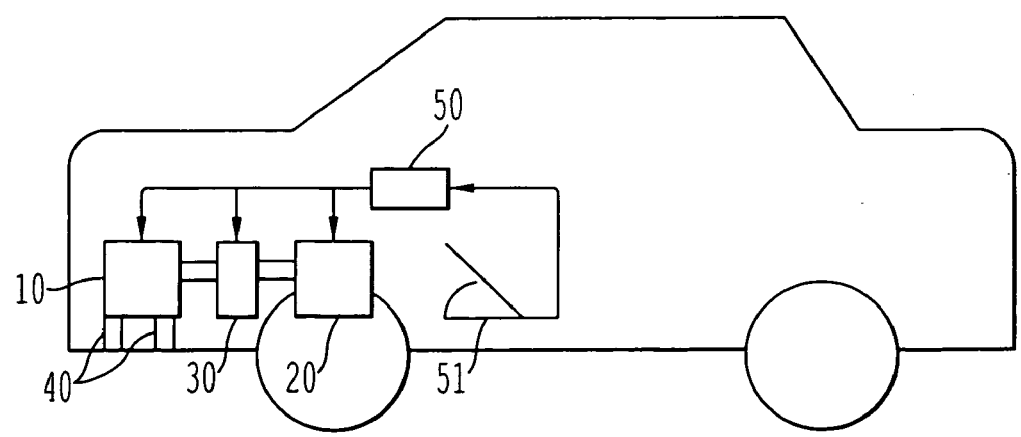
FIG. 16 shows a vehicle which includes an engine system according to an embodiment of the present invention.

FIG. 1 is a block diagram showing the construction of an engine system according to an embodiment of the present invention. FIG. 16 shows a hybrid vehicle which includes the engine system. The engine system includes a cylinder number variable engine 10 in which the number of activated cylinders can be controlled, an engine controller 11 for controlling the cylinder number variable engine 10, a continuously variable transmission (CVT) 20 for changing the transmission ratio continuously, a CVT controller 21 for controlling the CVT 20, a motor generator 30, a torque-variation adder 31, an engine mount 40 which suppresses vibration of the cylinder number variable engine 10, an engine-mount controller 41 for controlling the switching of frequency characteristics of the engine mount 40, and a central controller 50 for controlling each of the above-mentioned controllers. The motor generator is connected to a battery 34.

The engine system further includes an accelerator position sensor 51 for detecting an accelerator position, a crank position sensor 52 for detecting an engine speed Ne, that is, a rotational speed of the cylinder number variable engine 10, a coolant temperature sensor 53 for detecting the temperature of engine coolant (coolant temperature), a vehicle velocity sensor 54 for detecting a vehicle velocity Vel, a master-cylinder pressure sensor 55 for detecting a master-cylinder pressure which corresponds to the amount of brake operation.

The cylinder number variable engine 10 includes movable valves for changing the cylinders to be activated by closing intake/exhaust valves and an intake-air-flow control mechanism for controlling the amount of air which flows into the cylinders. The cylinder number variable engine 10 is a 4-cylinder engine including two pairs of cylinders, and activation/deactivation of the cylinders is controlled for each pair. More specifically, in the present embodiment, four cylinders are activated in the all-cylinder operation and two cylinders are activated in the reduced-cylinder operation. However, the number of cylinders included in the cylinder number variable engine 10 is not limited to this. The intake-air-flow control mechanism may include, for example, throttle valves. Alternatively, movable valves for controlling intake-valve openings may also be used instead of the throttle valves.

The engine controller 11 controls the operational state of the cylinder number variable engine 10 in accordance with a command issued by the central controller 50. For example, the engine controller 11 supplies an engine ignition signal to each of the cylinders of the cylinder number variable engine 10 or controls each of the cylinders individually to change the number of activated cylinders.

The CVT 20 outputs an output rotational speed on the basis of an input rotational speed corresponding to the rotational speed of the cylinder number variable engine 10 and a transmission ratio controlled continuously by the CVT controller 21. The CVT controller 21 continuously controls the transmission ratio of the CVT 20. In particular, when the number of cylinders activated in the cylinder number variable engine 10 is changed, the CVT controller 21 controls engine torque, engine speed and the reduction ratio of the CVT 20 such that the power of the cylinder number variable engine 10 is maintained constant.

A rotating shaft of the motor generator 30 is directly connected to a crank shaft of the cylinder number variable engine 10. Accordingly, during regenerative braking, the motor generator 30 serves as a load for the cylinder number variable engine 10 and electricity according to the rotational speed of the engine is stored in a battery. In addition, when an acceleration is required under predetermined conditions, the motor generator 30 is driven by the electricity stored in the battery to provide auxiliary power to the cylinder number variable engine 10 (hereafter referred to as torque assist). The rotating shaft of the motor generator 30 may also be indirectly connected to the crank shaft.

The rotational speed of the motor generator 30, that is, the rotational speed of the cylinder number variable engine 10 is controlled by the CVT 20 so that excessive torque would not be required of the motor generator 30. Accordingly, the rated output of the motor generator 30 is about several kilowatts. The motor generator 30 outputs torque in accordance with a command output from the torque-variation adder 31.

The torque-variation adder 31 calculates torque variation on the basis of an accelerator position Ta detected by the accelerator position sensor 51, the engine speed Ne detected by the crank position sensor 52, a motor-generator power Pm and an inertia torque Ti calculated by the central controller 50, and the engine ignition signal output by the engine controller 11. A crank angle signal (engine speed) may also be used instead of the engine ignition signal.

Figure 2:
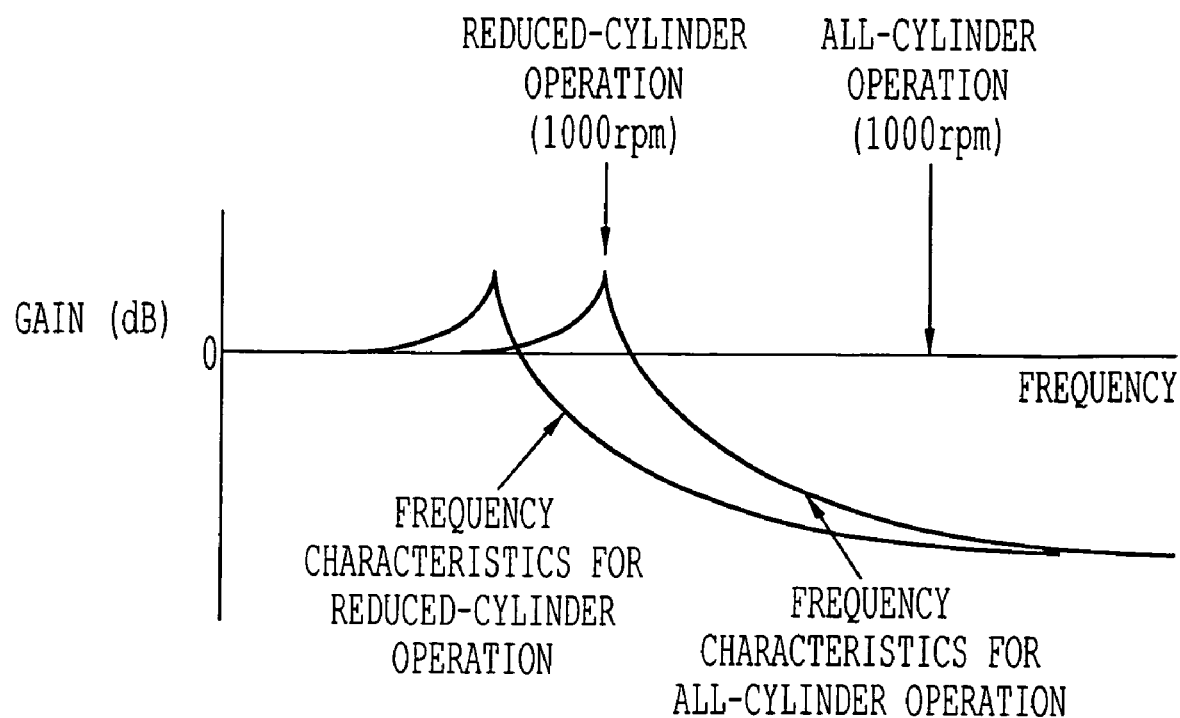
FIG. 2 is a graph showing resonance-frequency characteristics of an engine mount.

FIG. 2 is a graph showing resonance-frequency characteristics of the engine mount 40. In order to suppress vibration of the cylinder number variable engine 10 in both the all-cylinder operation and the reduced-cylinder operation, the engine mount 40 is constructed such that the resonance-frequency characteristics thereof can be switched between two patterns, as shown in FIG. 2. More specifically, the engine mount 40 has both the resonance-frequency characteristics for the reduced-cylinder operation and those for the all-cylinder operation. Accordingly, the engine-mount controller 41 sets the resonance-frequency characteristics of the engine mount 40 to those for the reduced-cylinder operation when the cylinder number variable engine 10 performs the reduced-cylinder operation and to those for the all-cylinder operation when the cylinder number variable engine 10 performs the all-cylinder operation.

Figure 17:
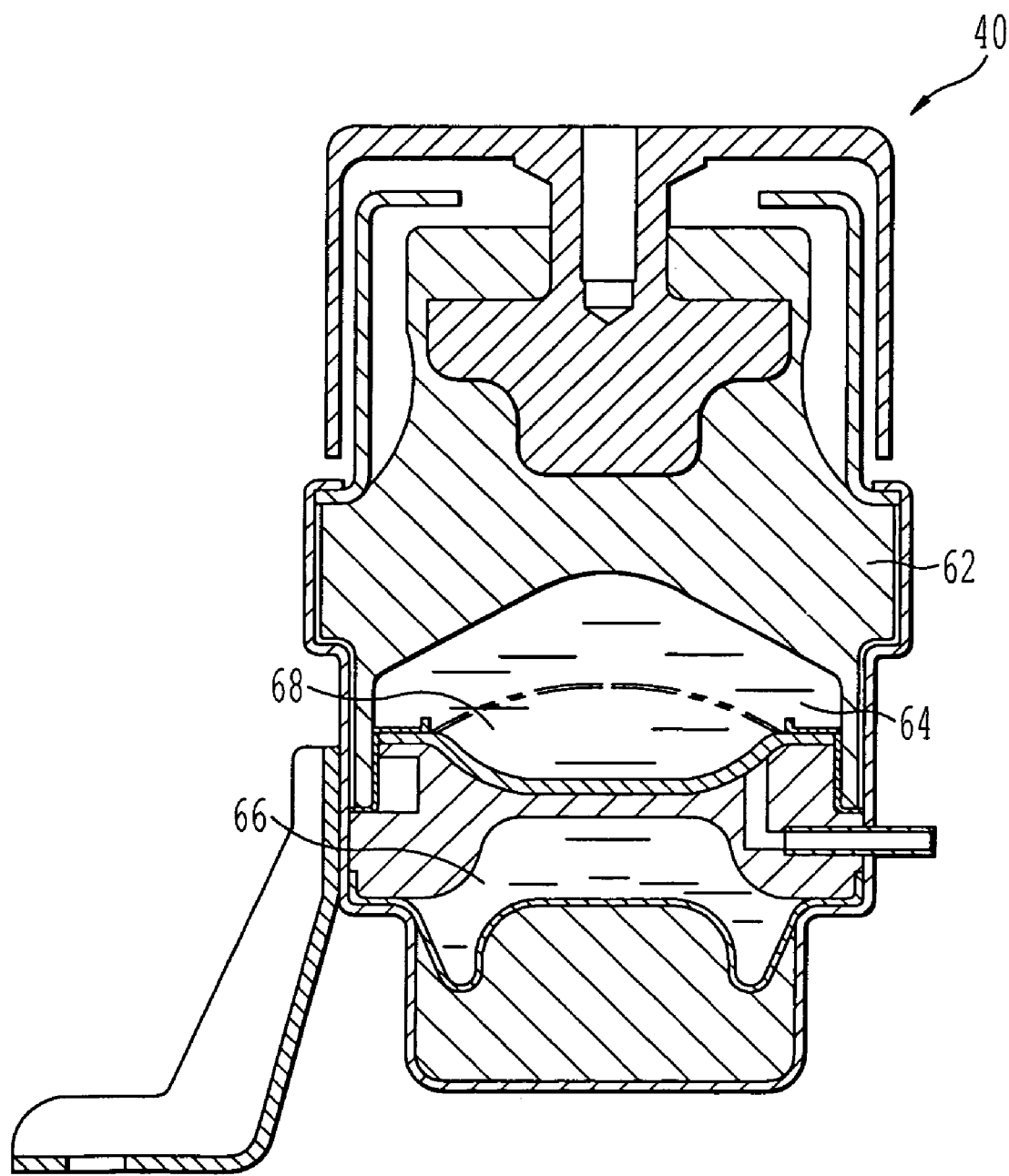
FIG. 17 is a cross-sectional view of an engine mount.

FIG. 17 shows an engine mount which has a variable resonance-frequency. Referring to FIG. 17, the engine mount 40 includes a rubber member 62, liquid chambers 64 and 66, and an air chamber 68 provided between the liquid chambers 64 and 66. The resonance-frequency of the engine mount 40 may be changed by changing the amount of air supplied in the air chamber. This engine mount is disclosed in Japanese Unexamined Patent Application Publication 2002-52940. The contents of this application are incorporated herein by reference in their entirety.

In known engine systems, when the operational state of the cylinder number variable engine 10 is changed from the reduced-cylinder operation to the all-cylinder operation for sudden acceleration, delay in the response of engine torque occurs due to distortion of the engine mount 40. Therefore, the engine-mount controller 41 according to the present embodiment switches the resonance-frequency characteristics of the engine mount 40 from those for the reduced-cylinder operation to those for the all-cylinder operation when the operational state of the cylinder number variable engine 10 is changed from the reduced-cylinder operation to the all-cylinder operation. Accordingly, the delay in the response of engine torque due to the distortion of the mounting system is prevented and the drivability is ensured.

The engine mount 40 may also be constructed such that the resonance-frequency characteristics are switched among three or more patterns or such that the resonance-frequency characteristics are changed continuously.

The central controller 50 determines the number of cylinders to be activated in the cylinder number variable engine 10 on the basis of signals obtained from the accelerator position sensor 51, the crank position sensor 52, the coolant temperature sensor 53, the vehicle velocity sensor 54, the master-cylinder pressure sensor 55, and the engine controller 11, and controls the overall system on the basis of the result of the determination.

During idling, the central controller 50 stops the operation of the cylinder number variable engine 10 using the engine controller 11. In addition, the central controller 50 controls the cylinder number variable engine 10 such that it performs the all-cylinder operation while the state of combustion in the cylinder number variable engine 10 is unstable, as will be described in detail below.

1. First Routine for Changing Number of Cylinders

Figure 3:
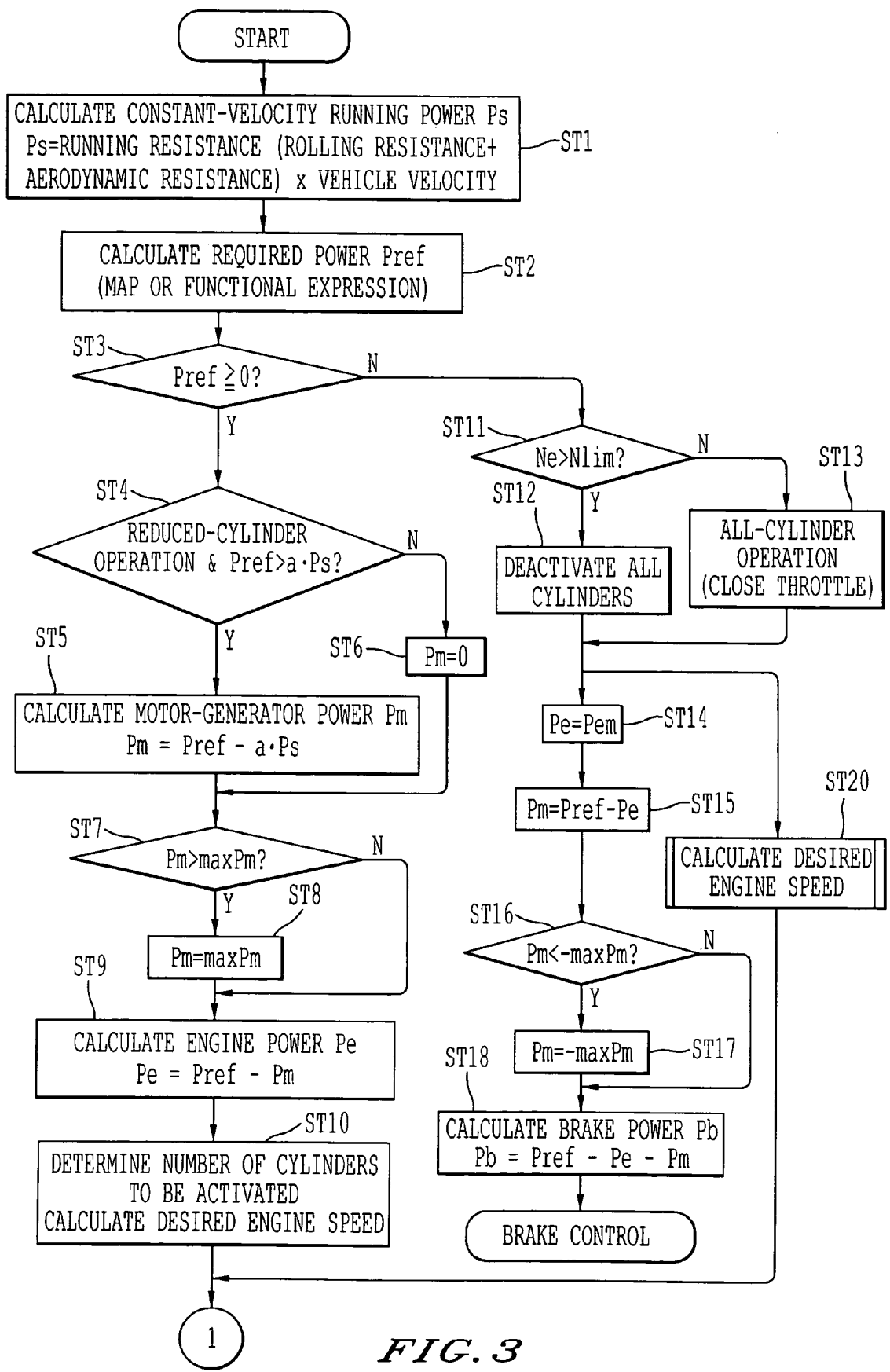
FIG. 3 is a flowchart showing routines performed by a central controller for changing the number of cylinders activated in a cylinder number variable engine.
Figure 4:
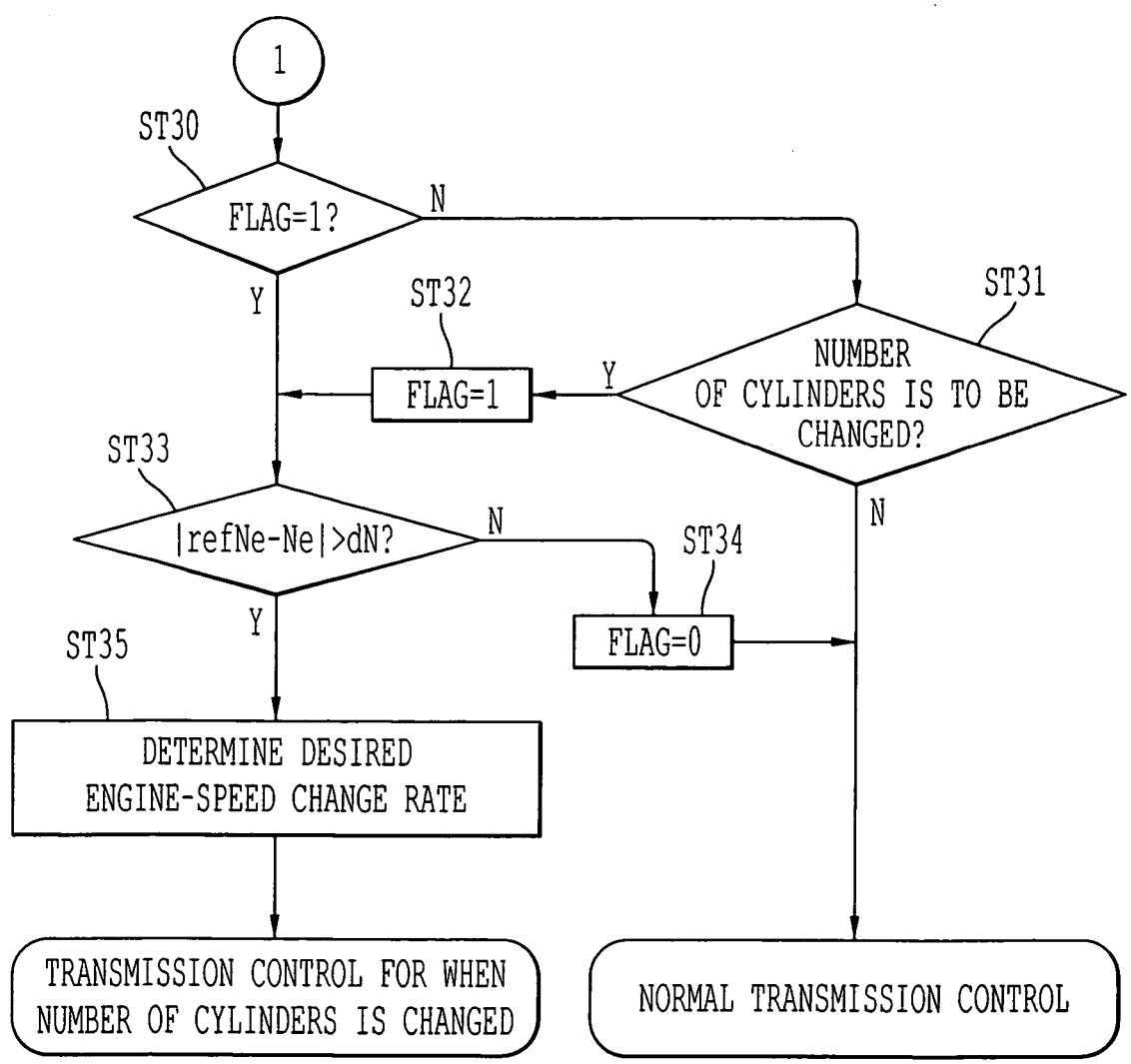
FIG. 4 is a flowchart showing another routine performed by the central controller for changing the number of cylinders activated in the cylinder number variable engine.

FIGS. 3 and 4 are flowcharts showing routines performed by the central controller 50 for changing the number of cylinders activated in the cylinder number variable engine 10. The central controller 50 stops the cylinder number variable engine 10 during idling. When the cylinder number variable engine 10 is started, the central controller 50 performs Step 1 and the following steps.

In Step 1, the central controller 50 calculates a power Ps required for the vehicle to move at a constant velocity on a flat road (hereafter called a "constant-velocity running power") using the vehicle velocity Vel detected by the vehicle velocity sensor 54. More specifically, the central controller 50 calculates the constant-velocity running power Ps as follows:

$$Ps = R \cdot Vel \qquad (1)$$

where R is a running resistance (=rolling resistance+aerodynamic resistance). Then, the process proceeds to Step 2.

In Step 2, the central controller 50 calculates a required power Pref, which is a power required by the vehicle, using the accelerator position Ta, the amount of brake operation Br (master-cylinder pressure), and the vehicle velocity Vel. Then, the process proceeds to Step 3.

The central controller 50 stores a map or a functional expression showing the relationship among the accelerator position Ta, the amount of brake operation Br, the vehicle velocity Vel, and the required power Pref. Accordingly, the central controller 50 uses this map or functional expression to calculate the required power Pref corresponding to the accelerator position Ta, the amount of brake operation Br, and the vehicle velocity Vel, which are input to the central controller 50.

The central controller 50 may also perform Steps 1 and 2 in the opposite order or simultaneously. Alternatively, Step 1 may also be performed at the time when Step 4 is performed.

In Step 3, the central controller 50 determines whether or not the required power Pref is equal to or larger than zero (Pref≧0). The process proceeds to Step 4 if the determination result is "Yes" and to Step 11 if the determination result is "No".

In Step 4, the central controller 50 determines whether or not the cylinder number variable engine 10 is performing the reduced-cylinder operation and (Pref>a·Ps) is satisfied. The process proceeds to Step 5 if the determination result is "Yes" and to Step 6 if the determination result is "No".

More specifically, if the cylinder number variable engine 10 is performing the reduced-cylinder operation and the required power Pref is larger than the product of the constant-velocity running power Ps and a predetermined coefficient a, the central controller 50 proceeds to Step 5 and causes the motor generator 30 to provide torque assist. The coefficient a is in the range of 0 to 10, and is set to, for example, 3.6 in the present embodiment.

Accordingly, the central controller 50 causes the motor generator 30 to provide torque assist to the cylinder number variable engine 10, so that the delay in the engine-torque response is compensated for when the cylinder number variable engine 10 accelerates while it is performing the reduced-cylinder operation. In addition, fuel consumption required for the acceleration is reduced.

FIGS. 5A to 5C are graphs showing vehicle velocity, prime mover power, and battery charge/discharge balance, respectively, in the 10–15 mode cycle when the coefficient a is 3.6. Since the conditions under which the central controller 50 provides torque assist for acceleration are limited in Step 4, energy regenerated during deceleration can cover the electric power required for the torque assist, as shown in FIG. 5C. Accordingly, the battery capacity can be reduced.

The battery capacity can be further reduced by increasing the coefficient a. In addition, since the conditions for providing torque assist for acceleration are limited as described above, the state of the engine output is changed from a steady state to a pre-steady state. Therefore, the state of engine combustion is maintained stable and the engine efficiency is prevented from being reduced in the transient operation. Accordingly, the fuel efficiency is increased.

When, for example, sudden acceleration is required and the cylinder number variable engine 10 must generate large toque, the central controller 50 determines to perform the all-cylinder operation in Step 10, as will be described in detail below. Accordingly, the rated output of the motor generator 30 can be reduced.

In Step 5, the central controller 50 calculates the motor-generator power Pm to be generated by the motor generator 30 to compensate for the deficiency of power of the cylinder number variable engine 10 during acceleration. More specifically, the following calculation is performed:

$$Pm = Pref - a \cdot Ps \qquad (2)$$

Then, the process proceeds to Step 7.

In Step 6, the central controller 50 sets the motor-generator power Pm to zero (Pm=0), and then the process proceeds to Step 7. This is because the power of the cylinder number variable engine 10 is sufficient and the motor-generator power Pm is not required if the determination result obtained by the central controller 50 in Step 4 is "No".

In Step 7, the central controller 50 determines whether or not the motor-generator power Pm is greater than a predetermined upper limit maxPm for the motor-generator's power assist (whether or not Pm>maxPm is satisfied). The process proceeds to Step 8 if the determination result is "Yes" and to Step 9 if the determination result is "No". The upper limit maxPm is set smaller than the rated output of the motor generator 30.

In Step 8, the central controller 50 sets the motor-generator power Pm to the upper limit maxPm (Pm=maxPm), and then the process proceeds to Step 9.

In Step 9, the central controller 50 calculates the engine power Pe to be generated by the cylinder number variable engine 10 as follows:

$$Pe = Pref - Pm \qquad (3)$$

Then, the process proceeds to Step 10.

In Step 10, the central controller 50 determines the number of cylinders to be activated in the cylinder number variable engine 10 by comparing the engine power Pe and a threshold Th for switching the number of cylinders, and calculates a desired engine speed refNe.

2. Process for Determining Number of Cylinders

Figure 6A:
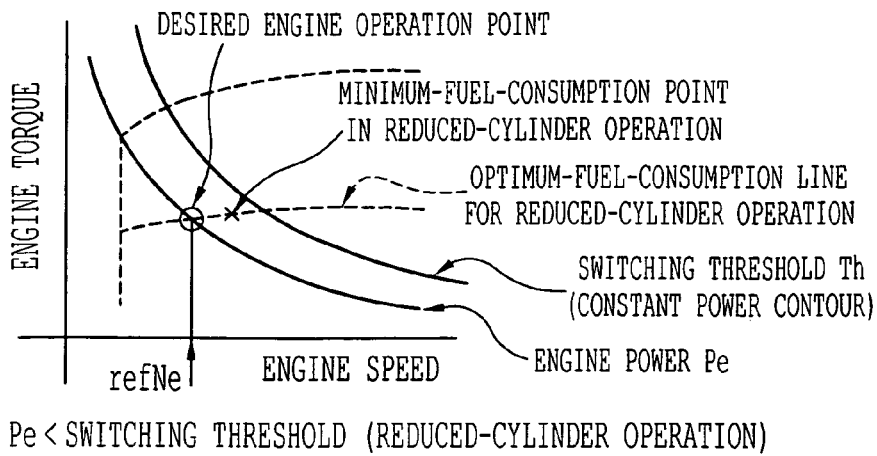
FIGS. 6A to 6C are graphs showing the relationship between the engine speed and the engine torque when the number of cylinders activated in the cylinder number variable engine is determined, where
Figure 6B:
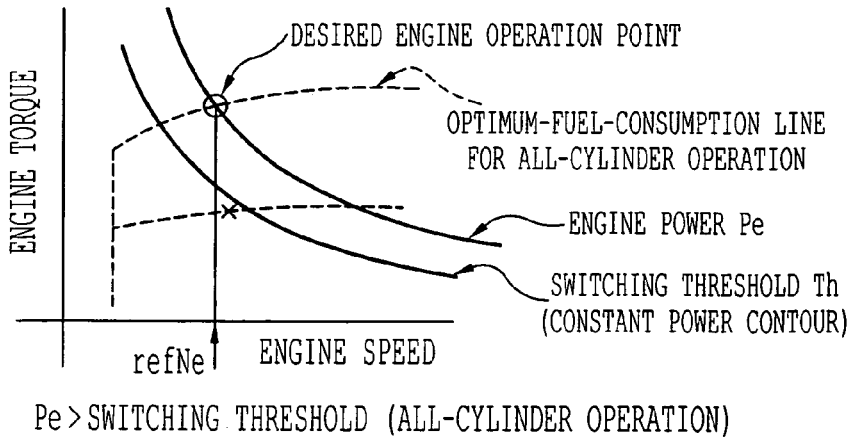
Figure 6C:
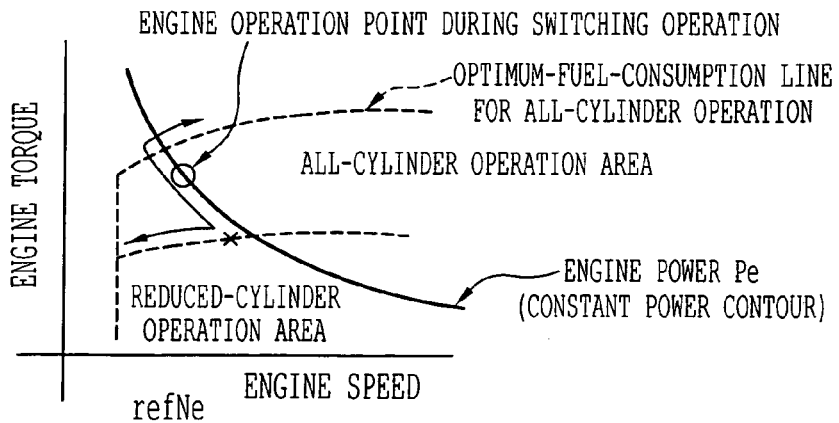

FIGS. 6A to 6C are graphs showing the relationship between the engine speed and the engine torque when the number of cylinders activated in the cylinder number variable engine 10 is determined. FIG. 6A shows the case in which the engine power Pe is smaller than the switching threshold Th, FIG. 6B shows the case in which the engine power Pe is larger than the switching threshold Th, and FIG. 6C shows the case in which the number of activated cylinders is being changed.

In FIGS. 6A to 6C, the switching threshold Th and the engine power Pe are on constant power contours. The constant power contours are lines showing the relationship between the engine speed and the engine torque when the engine power is constant. The constant power contour corresponding to the switching threshold Th preferably passes through a minimum-fuel-consumption point (marked by X) on an optimum-fuel-consumption line for the reduced-cylinder operation or a point slightly apart from the minimum-fuel-consumption point in the direction in which the engine power increases.

When the engine power Pe is smaller than the switching threshold Th, as shown in FIG. 6A, the central controller 50 sets the number of cylinders to be activated to two and determines that the cylinder number variable engine 10 is to perform the reduced-cylinder operation. In addition, the central controller 50 sets the desired engine operation point to the intersection point of the constant power contour corresponding to the engine power Pe and the optimum-fuel-consumption line for the reduced-cylinder operation, and calculates the engine speed at this desired engine operation point (the desired engine speed refNe).

When the engine power Pe is larger than the switching threshold Th, as shown in FIG. 6B, the central controller 50 determines that the cylinder number variable engine 10 is to perform the all-cylinder operation. In addition, the central controller 50 sets the desired engine operation point to the intersection point of the constant power contour corresponding to the engine power Pe and the optimum-fuel-consumption line for the all-cylinder operation, and calculates the engine speed at this desired engine operation point (the desired engine speed refNe). A control operation performed wile the number of cylinders is being changed will be described below.

3. Exceptional Process in Determining Number of Cylinders

As described above, the central controller 50 determines the number of cylinders to be activated in the cylinder number variable engine 10 by comparing the engine power Pe and the switching threshold Th. However, there may be a case in which it is not suitable to perform the reduced-cylinder operation depending on the state of engine combustion determined by the engine speed, the coolant temperature, etc.

Figure 7:
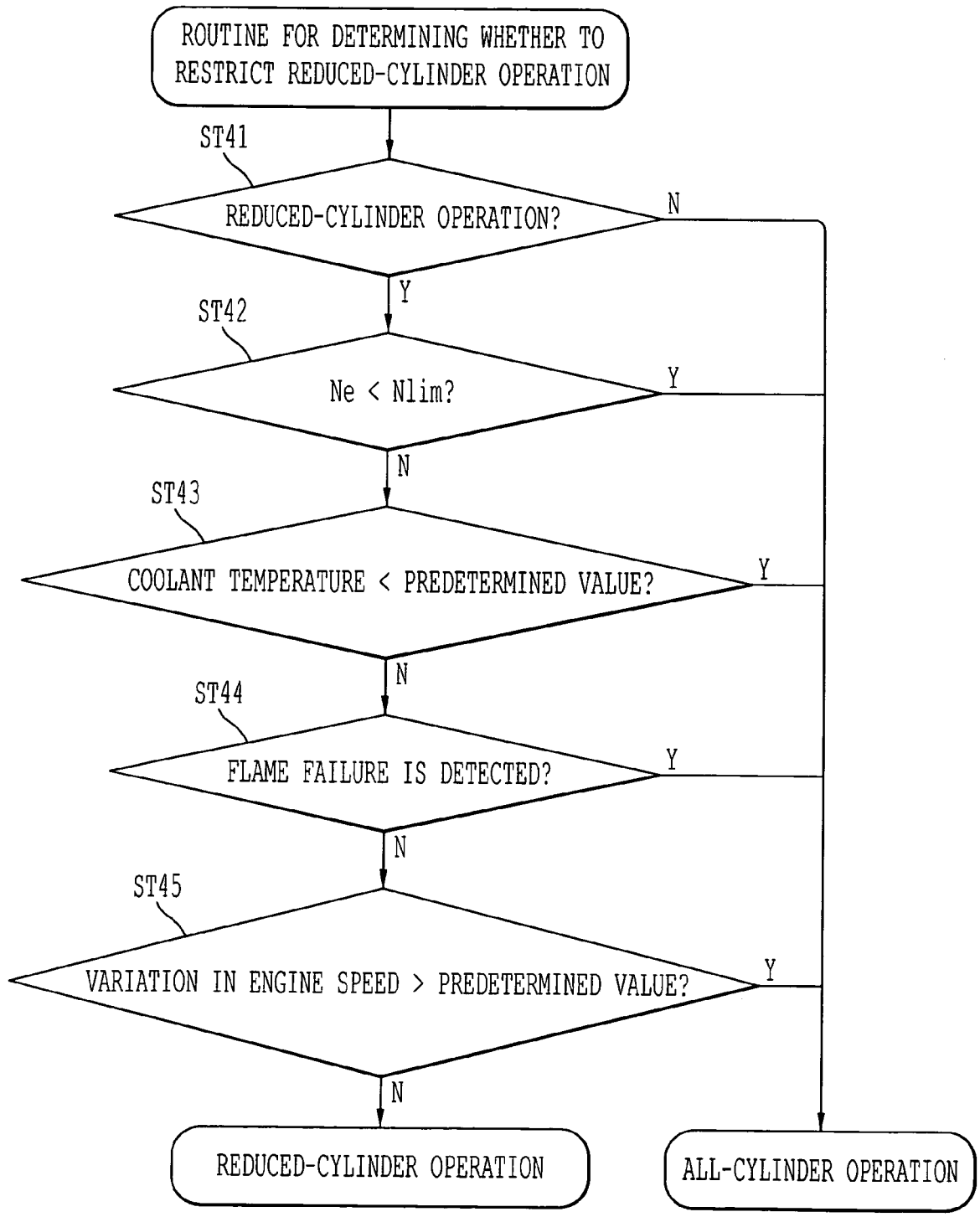
FIG. 7 is a flowchart showing a routine performed by the central controller for determining whether or not to restrict a reduced-cylinder operation.

FIG. 7 is a flowchart showing a routine performed by the central controller 50 for determining whether or not to restrict the reduced-cylinder operation. After determining the number of cylinders to be activated in the cylinder number variable engine 10 as described above, the central controller 50 performs Steps 41 to 45 shown in FIG. 7.

In Step 41, the central controller 50 determines whether or not to perform the reduced-cylinder operation. Accordingly, Step 41 corresponds to the above-described determination of the number of cylinders to be activated. The process proceeds to Step 42 if the determination result is "Yes", and it is determined that the all-cylinder operation is to be performed if the determination result is "No".

In Step 42, the central controller 50 determines whether or not the engine speed Ne is lower than an engine-speed limit Nlim for the reduced-cylinder operation (whether or not Ne<Nlim is satisfied). It is determined that the all-cylinder operation is to be performed if the determination result is "Yes", and the process proceeds to Step 43 if the determination result is "No".

In Step 43, the central controller 50 determines whether or not the coolant temperature is lower than a predetermined value. It is determined that the all-cylinder operation is to be performed if the determination result is "Yes", and the process proceeds to Step 44 if the determination result is "No".

In Step 44, the central controller 50 determines whether or not a misfire has been detected in the cylinder number variable engine 10. It is determined that the all-cylinder operation is to be performed if the determination result is "Yes", and the process proceeds to Step 45 if the determination result is "No".

In Step 45, the central controller 50 determines whether or not the variation in the engine speed Ne is larger than a predetermined value. It is determined that the all-cylinder operation is to be performed if the determination result is "Yes", and it is determined that the reduced-cylinder operation is to be performed if the determination result is "No". The order in which Steps 42 to 45 are performed is not particularly limited.

As described above, the central controller 50 determines to perform the all-cylinder operation when the determination result is "Yes" in at least one of Steps 42 to 45, that is, when the state of combustion in the cylinder number variable engine 10 is not good.

Then, if the central controller 50 determines to change the number of activated cylinders after the above-described process (that is, to switch the operational state from the reduced-cylinder operation to the all-cylinder operation or from the all-cylinder operation to the reduced-cylinder operation), the central controller 50 sets a determination flag showing whether or not to change the number of activated cylinders to "1". In addition, if the central controller 50 determines that it is not necessary to change the number of activated cylinders, the central controller 50 sets the determination flag to "0" and proceeds to Step 30 shown in FIG. 4.

4. Second Routine for Changing Number of Cylinders

In Step 11 shown in FIG. 3, the central controller 50 determines whether or not the engine speed Ne of the cylinder number variable engine 10 is higher than the engine-speed limit Nlim for the reduced-cylinder operation (whether or not Ne>Nlim is satisfied). The process proceeds to Step 12 if the determination result is "Yes" and to Step 13 if the determination result is "No". The engine-speed limit Nlim is the lower limit of the engine speed for performing the reduced-cylinder operation.

In Step 12, the central controller 50 determines to deactivate all of the cylinders in the cylinder number variable engine 10, and then the process proceeds to Steps 14 and 20.

In Step 13, the central controller 50 determines to activate all of the cylinders in the cylinder number variable engine 10 and to completely close the throttle. Then, the process proceeds to Step 14. Accordingly, the central controller 50 can prevent the delay in reactivation of the cylinder number variable engine 10 when reacceleration is required.

In Step 14, the central controller 50 sets the engine power Pe to an engine motoring power Pem (Pe=Pem), and then the process proceeds to Step 15.

In Step 15, the central controller 50 calculates the motor-generator power Pm as follows:

$$Pm = Pref - Pe \quad (4)$$

Then, the process proceeds to Step 16.

In Step 16, the central controller 50 determines whether or not the motor-generator power Pm is smaller than a predetermined lower limit−maxPm for the motor-generator's power assist (whether or not Pm<−maxPm is satisfied). The process proceeds to Step 17 if the determination result is "Yes" and to Step 18 if the determination result is "No".

In Step 17, the central controller 50 sets the motor-generator power Pm to the lower limit−maxPm (Pm=−maxPm), and then the process proceeds to Step 18.

In Step 18, the central controller 50 calculates a brake power Pb as follows:

$$Pb = Pref - Pe - Pm \quad (5)$$

Then, the central controller 50 performs brake control to obtain the brake power Pb by controlling the master-cylinder pressure using a skid controller (not shown). Accordingly, the central controller 50 performs brake control when the required power Pref is less than zero and when the required power Pref cannot be covered by the engine power Pe and the motor-generator power Pm.

5. Calculation of Desired Engine Speed during Deceleration

In Step 20, the central controller 50 calculates the desired engine speed refNe. The central controller 50 controls the reduction ratio of the CVT 20 such that it is maintained at the reduction ratio before the determination to decelerate (before the determination in Step 3) using the CVT controller 21. More specifically, the central controller 50 performs a subroutine described below.

Figure 8:
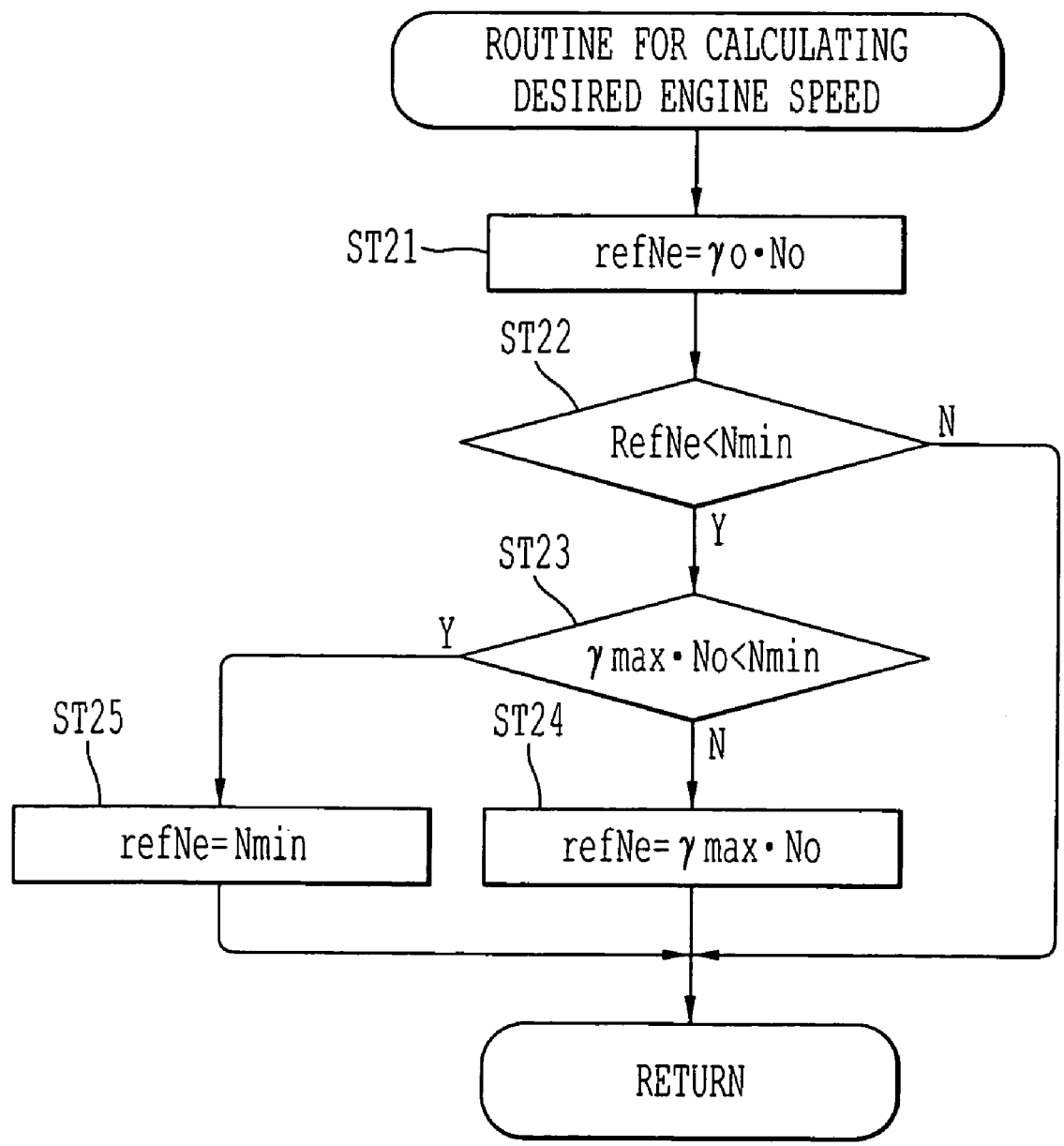
FIG. 8 is a flowchart showing a routine performed by the central controller for calculating a desired engine speed in Step 20.

FIG. 8 is a flowchart showing a routine performed by the central controller 50 for calculating the desired engine speed in Step 20. The central controller 50 performs Steps 21 to 25 shown in FIG. 8 in Step 20.

In Step 21, the central controller 50 calculates a provisional desired engine speed refNe as follows:

$$refNe = \gamma o \cdot No \quad (6)$$

where γo is the reduction ratio of the CVT 20 before the determination in Step 3 and No is the output rotational speed of the CVT 20. Then, the process proceeds to Step 22.

In Step 22, the central controller 50 determines whether or not the provisional desired engine speed refNe is lower than a minimum engine speed Nmin (whether or not refNe<Nmin is satisfied). The minimum engine speed Nmin is the lowest limit of the engine speed in the optimum-fuel-consumption line. The process proceeds to Step 23 if the determination result is "Yes". If the determination result is "No", the desired engine speed refNe to the value calculated in Step 21 and the process ends.

More specifically, the central controller 50 sets the desired engine speed refNe to the above-described provisional desired engine speed if it is the same as or higher than the minimum engine speed Nmin.

In Step 23, the central controller 50 determines whether or not $\gamma max \cdot No < Nmin$ is satisfied. The process proceeds to Step 25 if the determination result is "Yes" and to Step 24 if the determination result is "No". In the above expression, $\gamma max$ is the maximum reduction ratio. Accordingly, $\gamma max \cdot No$ is the smallest input rotational speed (=engine speed) assumed from the output rotational speed No of the CVT 20.

In Step 24, the central controller 50 sets the desired engine speed refNe to $\gamma max \cdot No$ (refNe=$\gamma max \cdot No$), and the process ends. In Step 25, the central controller 50 sets the desired engine speed refNe to the minimum engine speed Nmin (refNe=Nmin), and the process ends.

Accordingly, when the engine speed is the same as or lower than the engine-speed limit Nlim for the reduced-cylinder operation, the central controller 50 causes the cylinder number variable engine 10 to perform the all-cylinder operation and restricts the reduced-cylinder operation. In addition, also when the state of combustion is unstable, that is, when the coolant temperature is low, when a misfire is detected, or when the variation in engine speed is large, the central controller 50 causes the cylinder number variable engine 10 to perform the all-cylinder operation.

When the desired engine speed refNe during deceleration is determined by the central controller 50 as described above, the process proceeds to Step 30 shown in FIG. 4.

6. Third Routine for Changing Number of Cylinders

In Step 30 shown in FIG. 4, the central controller 50 determines whether or not the determination flag showing whether or not to change the number of cylinders is set to "1". The process proceeds to Step 33 if the determination result is "Yes" and to Step 31 if the determination result is "No".

In Step 31, the central controller 50 determines whether or not to change the number of cylinders activated in the cylinder number variable engine 10. If the determination result is "Yes", the process proceeds to Step 32. If the determination result is "No", a normal transmission control is performed. More specifically, the central controller 50 controls the CVT 20 such that the desired engine speed refNe is obtained using the CVT controller 21, and then the process ends.

In Step 32, the central controller 50 sets the determination flag to "1", and then the process proceeds to Step 33.

In Step 33, the central controller 50 determines whether or not the difference between the desired engine speed refNe and the engine speed Ne is larger than a predetermined threshold dN (whether or not |refNe−Ne|>dN is satisfied). The threshold dN is used to determine whether or not to finish the process for changing the number of cylinders. The process proceeds to Step 35 if the determination result is "Yes" and to Step 34 if the determination result is "No".

In Step 34, the central controller 50 sets the determination flag to "0". Then, the central controller 50 controls the CVT 20 such that the desired engine speed refNe is obtained using the CVT controller 21, and the process ends. More specifically, when the difference between the desired engine speed refNe and the engine speed Ne is small, the central controller 50 does not perform the process of changing the number of cylinders and sets the engine speed Ne to the desired engine speed refNe using only by the CVT 20.

In Step 35, the central controller 50 determines a desired engine-speed change rate on the basis of the accelerator position Ta, the engine speed Ne, and the vehicle velocity Vel by, for example, a method described below.

The central controller 50 stores a map or a functional expression showing the relationship among the accelerator position Ta, the engine speed Ne, the vehicle velocity Vel, and the desired engine-speed change rate. As described in detail below, the desired engine-speed change rate is set to compensate for dynamic characteristics of the CVT 20. The central controller 50 uses this map or functional expression to calculate the desired engine-speed change rate corresponding to the accelerator position Ta, the engine speed Ne, and the vehicle velocity Vel, which are input to the central controller 50. Then, the central controller 50 changes the number of cylinders activated in the cylinder number variable engine 10 and performs the transmission control of the CVT 20.

7. Transmission Control When Number of Cylinders is Changed

The central controller 50 changes the number of cylinders activated in the cylinder number variable engine 10 using the engine controller 11 and controls the CVT 20 and the motor generator 30 such that the desired engine speed refNe and the desired engine-speed change rate are obtained. More specifically, the central controller 50 performs the processes described below.

8. Control of Cylinder Number Variable Engine 10

Basically, the desired engine speed refNe for the reduced-cylinder operation is calculated from the desired engine operation point defined as the intersection point of the optimum-fuel-consumption line for the reduced-cylinder operation and the constant power contour of the engine power Pe, and the desired engine speed refNe for the all-cylinder operation is calculated from the desired engine operation point defined as the intersection point of the optimum-fuel-consumption line for the all-cylinder operation and the constant power contour of the engine power Pe. However, when the number of cylinders is changed instantaneously, the engine operation point suddenly changes and a significantly large torque shock occurs.

Accordingly, the central controller 50 controls the cylinder number variable engine 10 such that it outputs the engine power Pe while the number of cylinders is being changed, and uses the CVT 20 and the motor generator 30 in combination. Accordingly, as shown in FIG. 6C, the engine operation point smoothly moves along the constant power contour corresponding to the switching threshold Th from a reduced-cylinder operation area (area in which the power is smaller than the switching threshold Th) to an all-cylinder operation area (area in which the power is larger than the switching threshold Th), or from the all-cylinder operation area to the reduced-cylinder operation area.

When, for example, the operational state is changed from the reduced-cylinder operation to the all-cylinder operation, the central controller 50 gradually increases the outputs of the cylinders which have been deactivated in the cylinder number variable engine 10 and gradually reduces the outputs of the cylinders which have been activated in the cylinder number variable engine 10 using the engine controller 11, so that the cylinder number variable engine 10 continuously outputs the engine power Pe. Then, when the outputs of all of the cylinders in the cylinder number variable engine 10 become the same, the central controller 50 causes the cylinder number variable engine 10 to perform the all-cylinder operation. Accordingly, the central controller 50 moves the engine operation point along the constant power contour corresponding to the engine power Pe from the optimum-fuel-consumption line for the reduced-cylinder operation to the desired engine operation point (the desired engine speed refNe).

In addition, when the operational state is changed from the all-cylinder operation to the reduced-cylinder operation, the central controller 50 gradually reduces the outputs of the cylinders to be deactivated in the cylinder number variable engine 10 and gradually increases the outputs of the cylinders to be continuously activated in the cylinder number variable engine 10 using the engine controller 11, so that the cylinder number variable engine 10 continuously outputs the engine power Pe. Then, when the cylinders to be deactivated stop completely, the central controller 50 causes the cylinder number variable engine 10 to perform the reduced-cylinder operation. Accordingly, the central controller 50 moves the engine operation point along the constant power contour corresponding to the engine power Pe from the optimum-fuel-consumption line for the all-cylinder operation to the desired engine operation point (the desired engine speed refNe).

The cylinder number variable engine 10 is not particularly limited as long as it can control the engine output of each cylinder individually. For example, a throttle may be provided for each of the cylinders, the intake air flow may be controlled by controlling the amount of lift of an intake valve, or the amount of fuel injection may be controlled.

9. Control of CVT 20 and Motor Generator 30

When the engine operation point is changed, that is, when the engine speed is changed, an inertial torque Ti is generated accordingly. Therefore, in addition to controlling the cylinder number variable engine 10 as described above, the central controller 50 determines the desired engine-speed change rate such that the motor generator 30 can absorb the inertial torque Ti and continuously controls the reduction ratio of the CVT 20 such that the engine-speed change rate is less than the desired engine-speed change rate.

The actual engine speed is different from the desired engine speed refNe. This is because of the response delay of the control system for the CVT 20. The dynamic characteristics of the CVT 20 are expressed as the sum of a first-order lag and a dead time. The central controller 50 determines the desired engine-speed change rate in the above-described Step 35 while compensating for the above-described difference by taking the dynamic characteristics of the CVT 20 into account.

The central controller 50 calculates the inertial torque Ti by multiplying the desired engine-speed change rate after the compensation for the dynamic characteristics of the CVT 20 by an engine rotational inertia, as follows:

$$Ti = \text{desired engine-speed change rate} \times \text{engine rotational inertia} \quad (7)$$

The inertial torque Ti is a torque variation generated when the number of cylinders activated in the cylinder number variable engine 10 is changed and the engine operation point is moved. The central controller 50 supplies the calculated inertial torque Ti to the torque-variation adder 31.

10. Construction of Torque-Variation Adder 31

Figure 9:
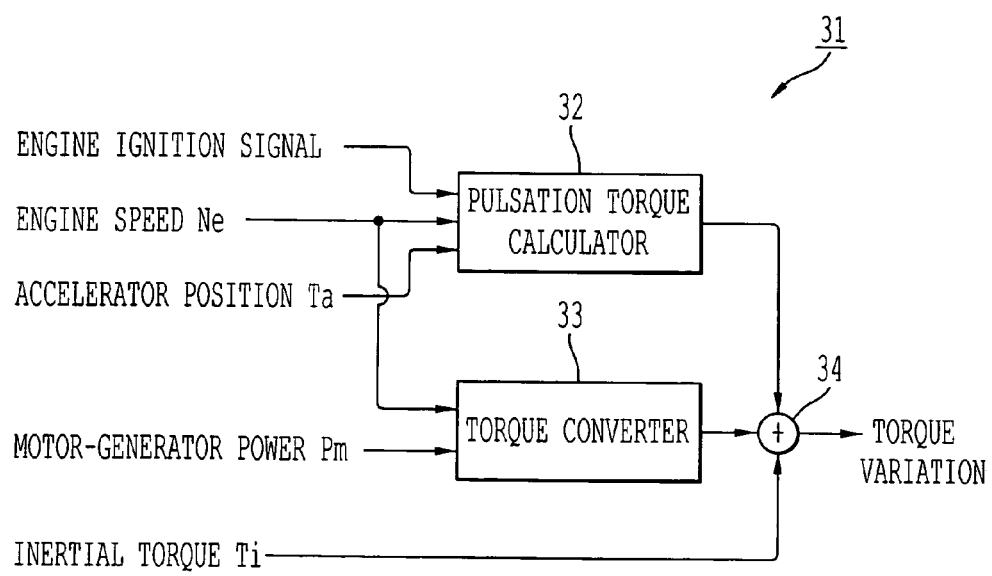
FIG. 9 is a block diagram showing the construction of a torque-variation adder.

FIG. 9 is a block diagram showing the construction of the torque-variation adder 31. The torque-variation adder 31 includes a pulsation torque calculator 32 which calculates a pulsation torque of the cylinder number variable engine 10, a torque converter 33 which converts the motor-generator power Pm into torque, and an adder 34 which adds the pulsation torque, the torque corresponding to the motor-generator power Pm, and the inertial torque Ti.

The pulsation torque calculator 32 stores a map or a functional expression showing the relationship among the engine ignition signal, the engine speed Ne, the accelerator position Ta, and the pulsation torque. Accordingly, the pulsation torque calculator 32 refers to the map or the functional expression and calculates the pulsation torque, which occurs each time the engine combustion occurs, on the basis of the engine ignition signal, the engine speed Ne, and the accelerator position Ta. The thus calculated pulsation torque is supplied to the adder 34.

The torque converter 33 converts the motor-generator power Pm into torque. More specifically, when the motor generator 30 rotates at the same rotational speed as the engine shaft, the torque converter 33 calculates a motor-generator torque Tm using the motor-generator power Pm and the engine speed Ne as follows:

$$Tm = \frac{Pm}{Ne} \quad (8)$$

The adder 34 calculates the torque variation by adding the pulsation torque calculated by the pulsation torque calculator 32, the motor-generator torque Tm obtained by the torque converter 33, and the inertial torque Ti calculated by the central controller 50, and supplies the torque variation to the motor generator 30.

The motor generator 30 generates torque based on the torque variation calculated by the torque-variation adder 31. Thus, the motor generator 30 compensates for the pulsation torque generated each time the engine combustion occurs in the cylinder number variable engine 10 and the inertial torque Ti generated when the number of activated cylinders is changed. In addition, during acceleration, the motor generator 30 outputs the motor-generator power Pm to avoid the delay in torque response.

As described above, in the engine system according to the present embodiment, when the number of cylinders activated in the cylinder number variable engine 10 is changed, the engine operation point is changed while controlling the engine speed by the CVT 20. At this time, the motor generator 30 compensates for the inertial torque Ti caused when the engine operation point changes, so that variation in the engine torque is suppressed and the drivability is ensured.

In addition, in the above-described engine system, the frequency characteristics of the engine mount 40 are changed depending on the ignition frequency of the cylinder number variable engine 10 or the number of cylinders activated in the cylinder number variable engine 10 so as to avoid the delay in torque response due to the distortion of the mounting system in, for example, sudden acceleration.

In addition, in the above-described engine system, the motor generator 30 is driven so as to provide torque assist to the cylinder number variable engine 10 only when the reduced-cylinder operation is being performed and the required power Pref is larger than the product of the constant-velocity running power Ps and the predetermined coefficient. Accordingly, the delay in torque response caused when the vehicle accelerates while performing the reduced-cylinder operation is avoided and the fuel consumption is greatly reduced.

The present invention is not limited to the above-described embodiment, and may also be applied to examples described below.

11. Chattering Prevention 1

When the engine power Pe varies between values higher and lower than the switching threshold Th, chattering occurs in which the operational state is frequently switched between the all-cylinder operation and the reduced-cylinder operation. In order to prevent this, the central controller 50 may also determine whether or not to switch between the all-cylinder operation and the reduced-cylinder operation as described below.

Figure 10:
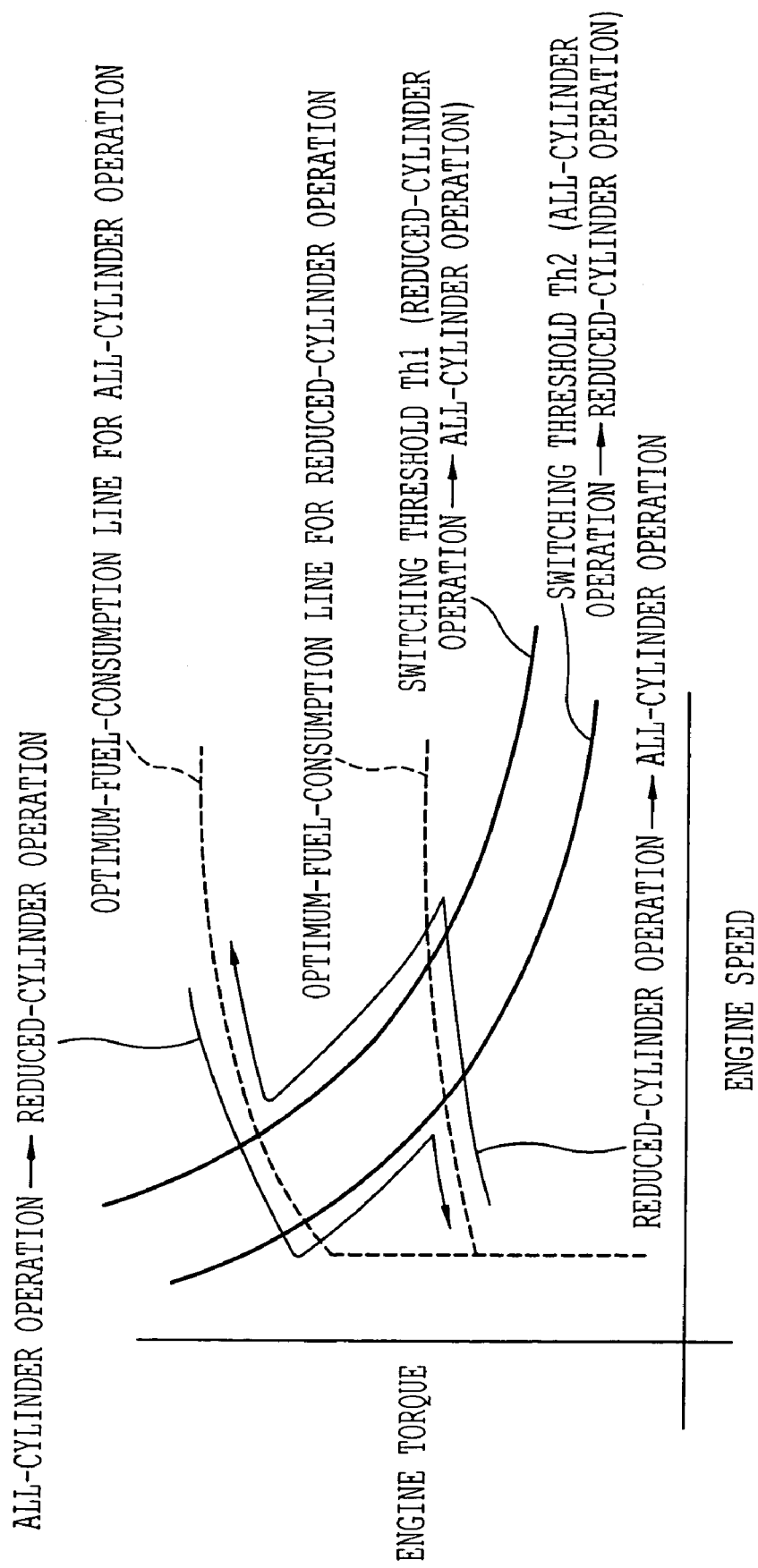
FIG. 10 is a graph showing two switching thresholds Th1 and Th2 used for determining the number of cylinders to be activated in the cylinder number variable engine.

FIG. 10 is a graph showing two switching thresholds Th1 and Th2 used for determining the number of cylinders to be activated in the cylinder number variable engine 10. Different from the graphs shown in FIGS. 6A to 6C, two switching thresholds Th1 and Th2 are provided. The first switching threshold Th1 is compared to the engine power Pe when the reduced-cylinder operation is being performed and the second switching threshold Th2 is compared to the engine power Pe when the all-cylinder operation is being performed. The second switching threshold Th2 is smaller than the first switching threshold Th1. In the above-described Step 10, the central controller 50 performs the process described below using the switching thresholds Th1 and Th2.

When the reduced-cylinder operation is being performed, the central controller 50 compares the engine power Pe and the first switching threshold Th1. The current operation, that is, the reduced-cylinder operation is selected when the engine power Pe is equal to or smaller than the first switching threshold Th1, and the all-cylinder operation is selected when the engine power Pe is larger than the first switching threshold Th1.

In addition, when the all-cylinder operation is being performed, the central controller 50 compares the engine power Pe and the second switching threshold Th2. The current operation, that is, the all-cylinder operation is selected when the engine power Pe is equal to or larger than the second switching threshold Th2, and the reduced-cylinder operation is selected when the engine power Pe is smaller than the second switching threshold Th2.

As described above, when the central controller 50 determines the operational state, it compares the engine power Pe to the first switching threshold Th1 when the reduced-cylinder operation is being performed, and to the second switching threshold Th2 when the all-cylinder operation is being performed. Accordingly, when the engine power Pe reaches one of the switching thresholds Th1 and Th2 and the operational state switches, the operational state will not switch again until the engine power Pe is changed beyond the other one of the switching thresholds Th1 and Th2. Therefore, chattering can be reliably prevented.

12. Chattering Prevention 2

The central controller 50 can also prevent chattering even when only one switching threshold Th is provided, as shown in FIGS. 6A to 6C.

Figure 11:
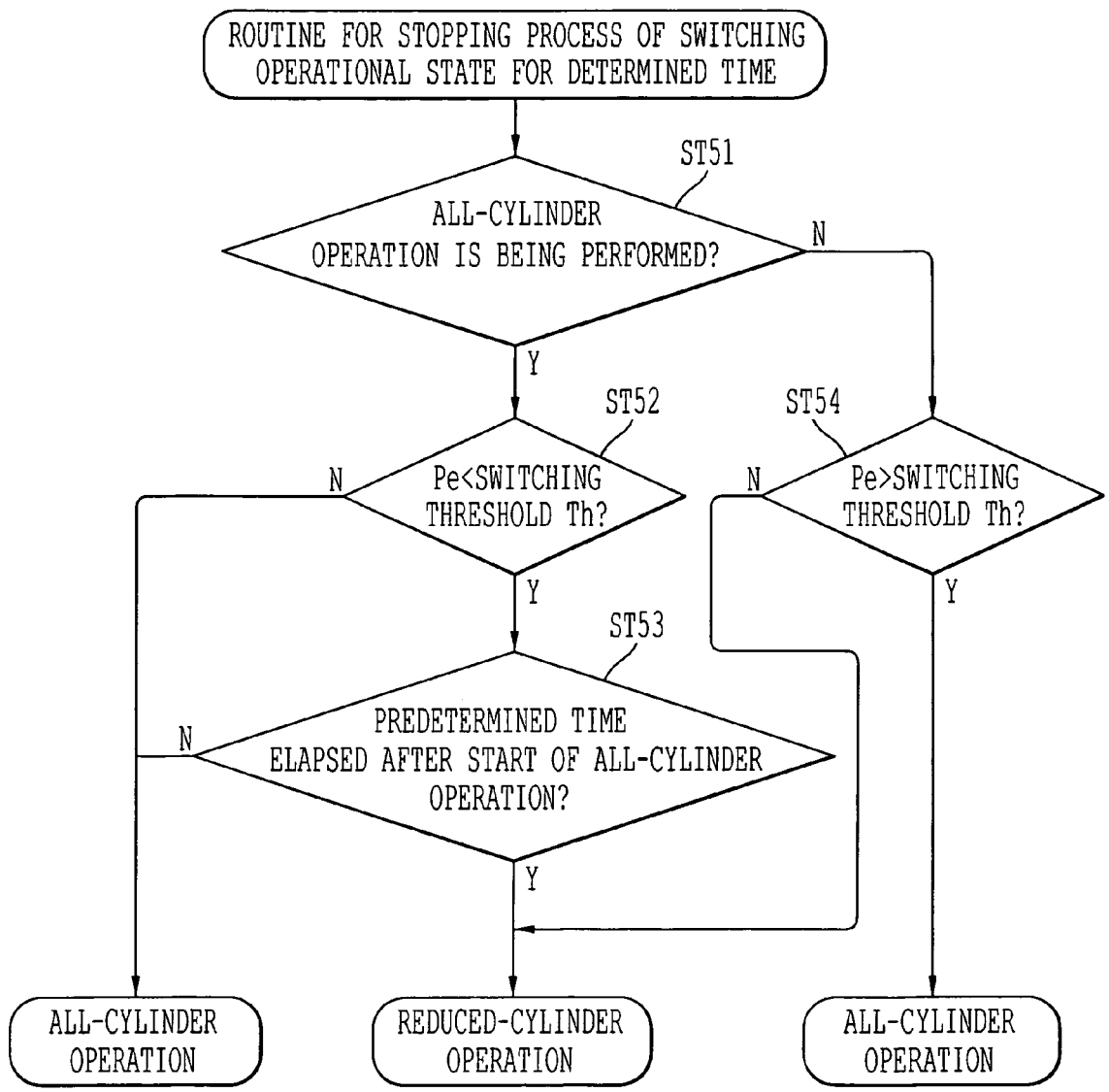
FIG. 11 is a flowchart showing a routine performed by the central controller for stopping the process of switching the operational state of the cylinder number variable engine for a predetermined time.

FIG. 11 is a flowchart showing a routine performed by the central controller 50 for stopping the process of switching the operational state of the cylinder number variable engine 10 for a predetermined time.

In Step 51, the central controller 50 determines whether or not the cylinder number variable engine 10 is performing the reduced-cylinder operation. The process proceeds to Step 52 if the determination result is "Yes" and to Step 54 if the determination result is "No".

In Step 52, the central controller 50 determines whether or not the engine power Pe is smaller than the switching threshold Th (whether or not Pe<Th is satisfied), and the process proceeds to Step 53 if the determination result is "Yes". If the determination result is "No", the central controller 50 determines to continue the all-cylinder operation and the process ends. This is because it is not necessary to perform the reduced-cylinder operation since the engine power Pe is equal to or larger than the switching threshold Th.

In Step 53, the central controller 50 determines whether or not a predetermined time has elapsed since the start of the all-cylinder operation. The central controller 50 determines to switch the operational state to the reduced-cylinder operation if the determination result is "Yes" and determines to continue the all-cylinder operation if the determination result is "No". Accordingly, even when the engine power Pe is smaller than the switching threshold Th, the central controller 50 does not switch the operational state to the reduced-cylinder operation until the predetermined time elapses after the start of the all-cylinder operation.

In Step 54, the central controller 50 determines whether or not the engine power Pe is larger than the switching threshold Th (whether or not Pe>Th is satisfied), and determines to switch the operational state to the all-cylinder operation if the determination result is "Yes". If the determination result is "No", the central controller 50 determines to continue the reduced-cylinder operation. This is because it is not necessary to perform the all-cylinder operation since the engine power Pe is equal to or smaller than the switching threshold Th if the determination result is "No". When the engine power Pe exceeds the switching threshold Th while the reduced-cylinder operation is being performed, the central controller 50 immediately switches the operational state to the all-cylinder operation to respond to the acceleration requirement.

As described above, the central controller 50 switches the reduced-cylinder operation to the all-cylinder operation when the engine power Pe is equal to or larger than the switching threshold Th, but restricts the operational state from being switched back to the reduced-cylinder operation for a predetermined time after the start of the all-cylinder operation. Accordingly, chattering in which the number of activated cylinders changes frequently can be prevented.

13. Exception Handling in Reduced-Cylinder Operation

Even when the engine power Pe is within the range corresponding to the reduced-cylinder operation, if the rate of increase of the required power Pref over time is larger than a predetermined value, delay in torque response may occur due to the distortion of the mounting system. In such a case, the central controller 50 causes the cylinder number variable engine 10 to perform the all-cylinder operation to increase the rigidity of the engine-mounting system.

Figure 12:
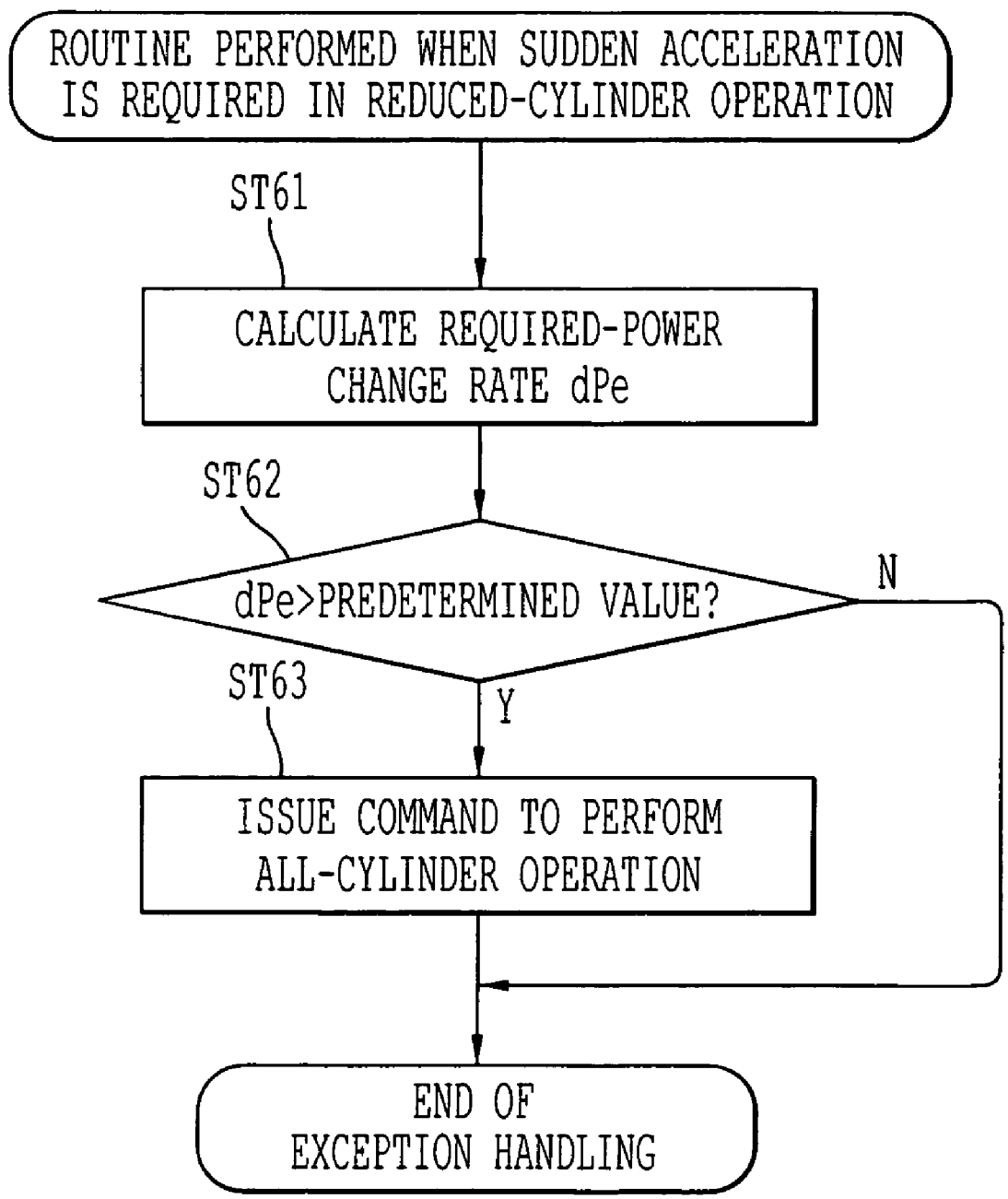
FIG. 12 is a flowchart showing a routine performed when sudden acceleration is required while the reduced-cylinder operation is being performed.
Figure 13:
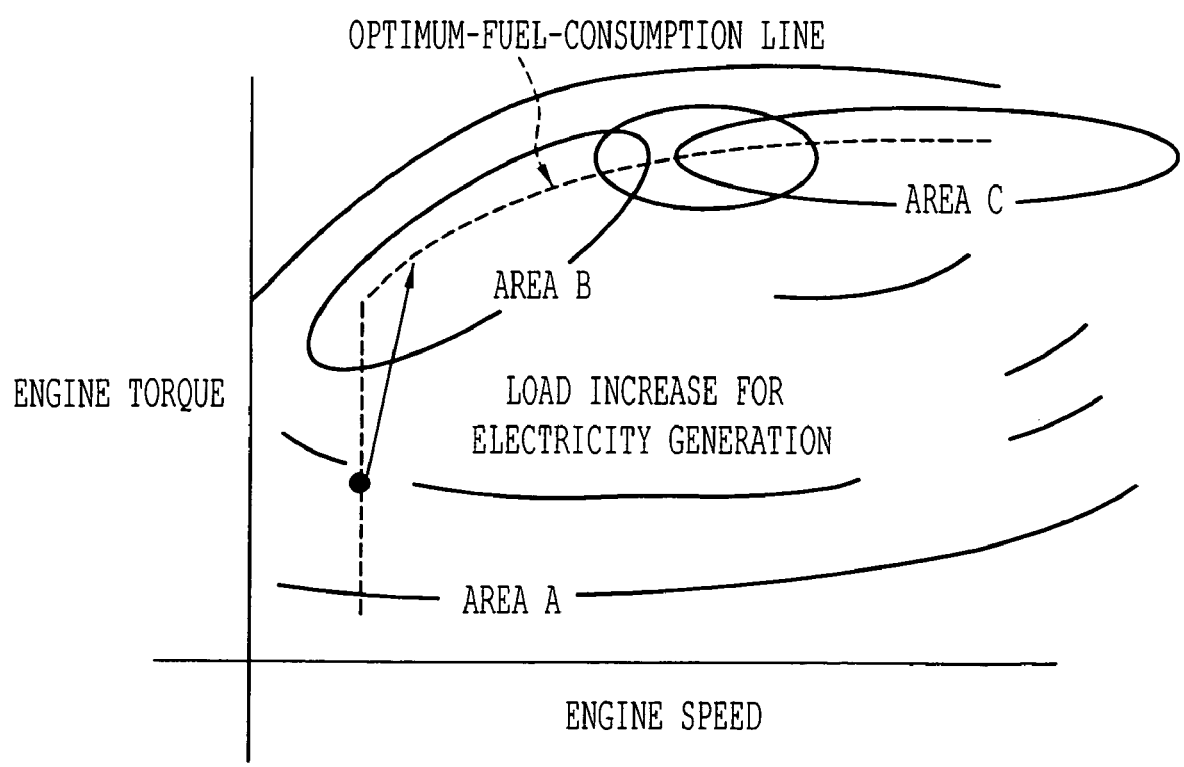
FIG. 13 is a graph showing constant fuel-consumption contours and an optimum-fuel-consumption line of an engine.
Figures 14A, 14B:
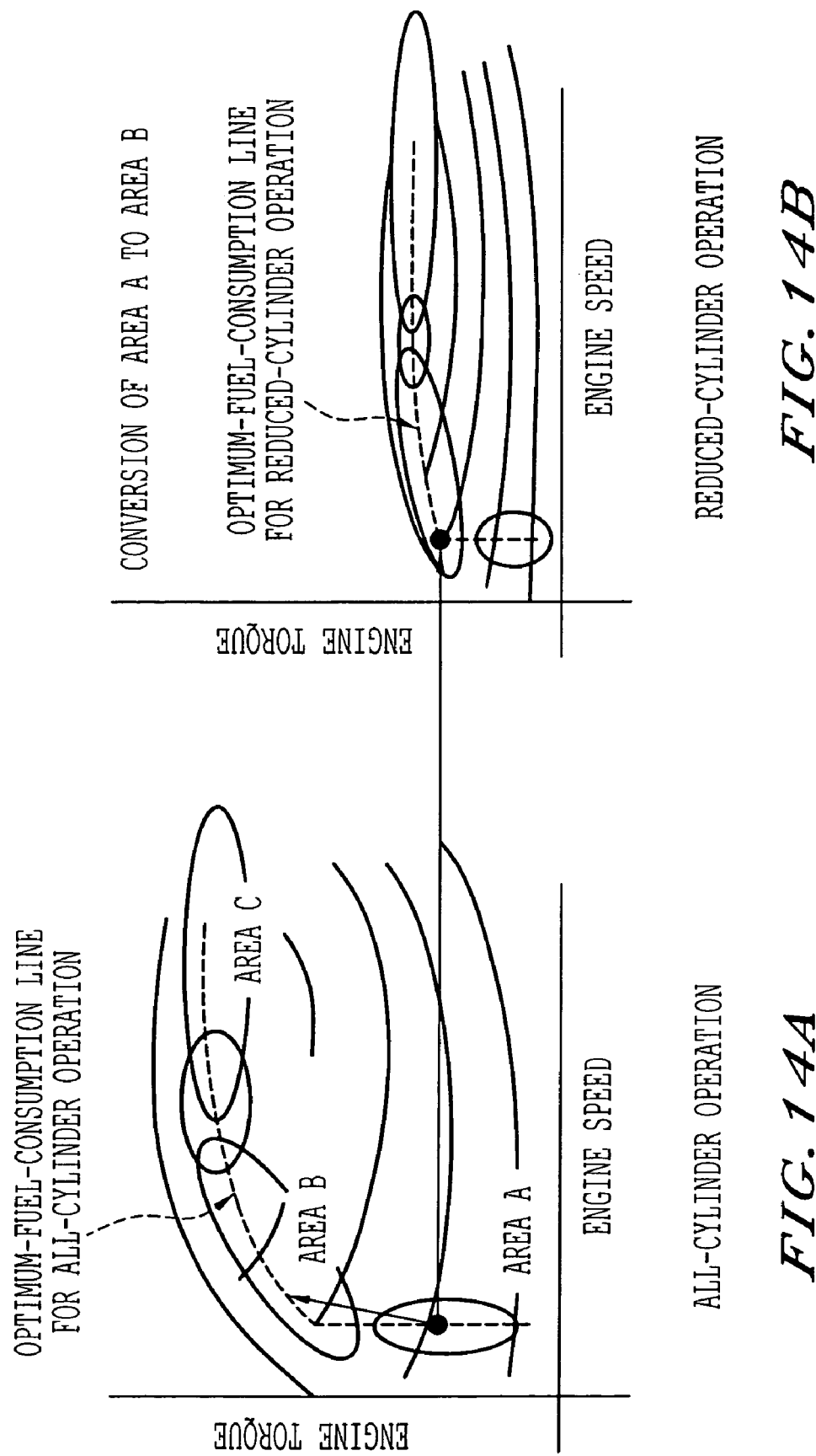
FIG. 14A shows a graph showing an optimum-fuel-consumption line when a known cylinder number variable engine performs an all-cylinder operation and FIG. 14B shows a graph showing an optimum-fuel-consumption line when the cylinder number variable engine performs a reduced-cylinder operation.
Figure 15:
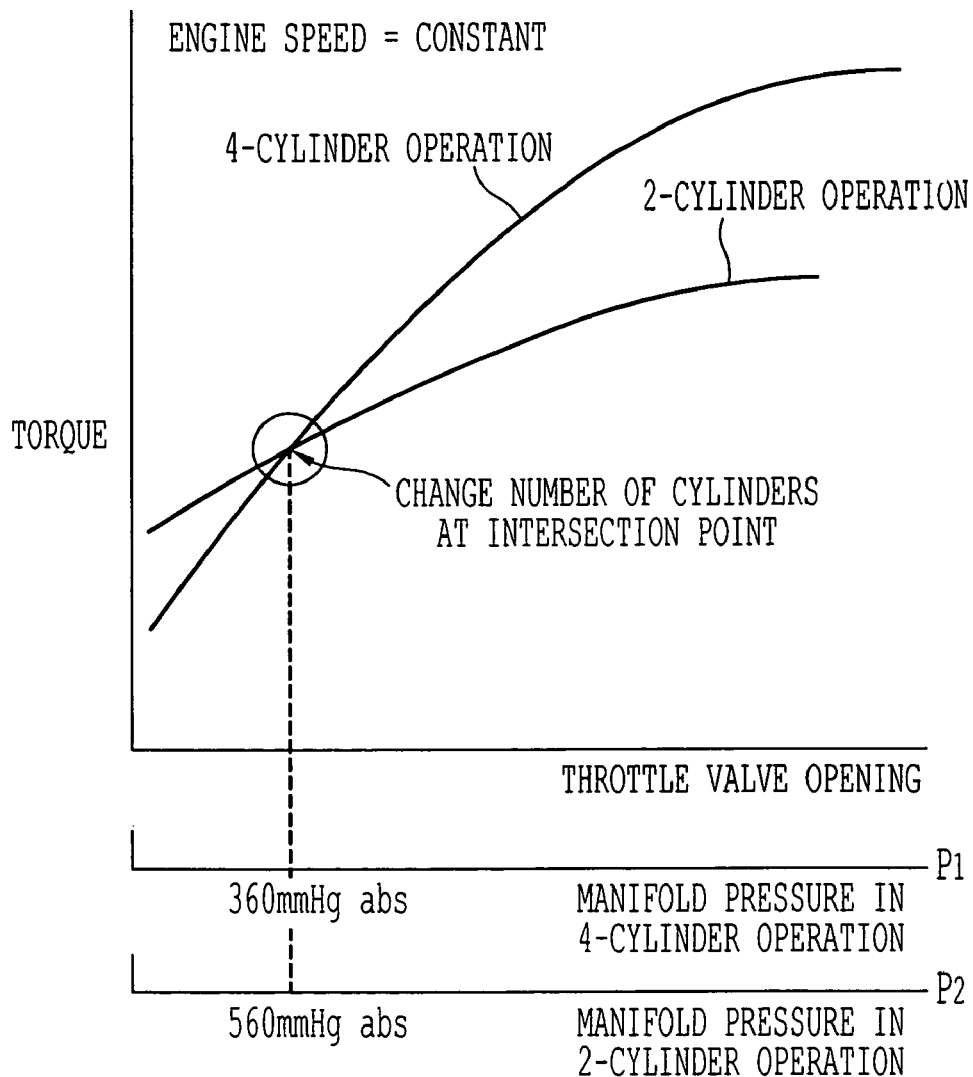
FIG. 15 is a graph of output torque versus throttle-valve opening in a 4-cylinder operation and a 2-cylinder operation.

FIG. 12 is a flowchart showing a routine performed when sudden acceleration is required while the reduced-cylinder operation is being performed.

In Step 61, the central controller 50 calculates a required-power change rate dPe over time. Then, the process proceeds to Step 62. The required-power change rate dPe is obtained by differentiating the required power Pref with respect to time.

In Step 62, the central controller 50 determines whether or not the required-power change rate dPe is larger than a predetermined value. The process proceeds to Step 63 if the determination result is "Yes", and the process ends if the determination result is "No". The predetermined value is a switching threshold for determining whether or not sudden acceleration is being required, and is therefore set to a relatively large value. Accordingly, sudden acceleration is not required if the determination result is "No", and therefore the central controller 50 continues the reduced-cylinder operation.

In Step 63, the central controller 50 commands the cylinder number variable engine 10 to switch the operational state to the all-cylinder operation using the engine controller 11. Accordingly, if sudden acceleration is required while the reduced-cylinder operation is being performed, the cylinder number variable engine 10 switches the operational state to the all-cylinder operation so that the rigidity of the engine-mounting system is increased and the delay in torque response is prevented.

In the above embodiment, the controller is configured to control the engine to change the running condition between the reduced-cylinder operation and the all-cylinder operation. However, the controller may be configured to control the engine to change the running condition by activating or deactivating every single cylinder. For example, in a four cylinder engine, there are four running conditions, i.e., all-cylinder operation, one-cylinder deactivated operation, two-cylinder deactivated operation, and three-cylinder deactivated operation.

In the above embodiment, although the engine system includes a motor 30, the present invention includes an engine system which has an engine without a motor to assist the engine. Namely, the present invention is not limited to hybrid vehicles, but includes vehicles other than hybrid vehicles.

As the CVT 20, any type of the CVT can be used as long as the CVT can continuously change the transmission ratio. For example, a mechanical type CVT such as a belt type CVT and a toroidal CVT, an electrical type CVT using a motor and planet gears, and the like can be used.

Obviously, numerous modifications and variations of the present invention are possible in light of the above teachings. It is therefore to be understood that within the scope of the appended claims, the invention may be practiced otherwise than as specifically described herein.

What is claimed is:

1. An engine system comprising:
    an engine which has an engine shaft and plural cylinders and in which a number of activated cylinders among the plural cylinders is variable;
    a continuously variable transmission configured to transmit a rotation of the engine shaft to wheels of a vehicle at a transmission ratio which is continuously variable; and
    a controller configured to control the engine to change the number of activated cylinders keeping an engine power generated by the engine to be substantially constant.

2. An engine system according to claim 1, wherein the controller is configured to control the engine to gradually increase a power generated by each of deactivated cylinders and gradually decrease a power generated by each of the activated cylinders in order to keep the engine power to be substantially constant when the controller controls the engine to increase the number of activated cylinders.

3. An engine system according to claim 1, wherein the controller is configured to control the engine to operate under an optimum fuel consumption condition at least other than a period during which the controller controls the engine to change the number of activated cylinders.

4. An engine system according to claim 1, further comprising:
    a motor having a motor shaft connected to the engine shaft, the controller being configured to control the motor to generate motor torque to substantially cancel inertial torque generated by changing an engine speed.

5. An engine system according to claim 1, further comprising:
    a motor having a motor shaft connected to the engine shaft, the controller being configured to control the motor to generate motor torque to substantially cancel pulsation torque generated by engine combustion.

6. An engine system according to claim 1, further comprising:
    a motor having a motor shaft connected to the engine shaft; and
    a torque adder configured to calculate torque change based on inertial torque generated by changing an engine speed and pulsation torque generated by engine combustion, the controller being configured to control the motor to generate motor torque according to the torque change to substantially cancel the inertial torque and the pulsation torque.

7. An engine system according to claim 1, further comprising:
    a rechargeable battery; and
    a motor having a motor shaft connected to the engine shaft, the controller being configured to control the motor to add additional motor power to the engine power generated by the engine when the vehicle is accelerated, the motor being configured to generate electric power to be stored in the rechargeable battery when the vehicle is decelerated.

8. An engine system according to claim 1, wherein the controller is configured to control the transmission to change the transmission ratio in order to keep a change rate in the engine speed to be lower than a predetermined change rate.

9. An engine system according to claim 1, further comprising:
    an engine mount on which the engine is mounted, a resonance frequency of the engine mount being variable.

10. An engine system according to claim 9, wherein the controller is configured to control the engine mount to increase the resonance frequency of the engine mount as the controller increases the number of activated cylinders.

11. An engine system according to claim 1, further comprising:
    a motor having a motor shaft connected to the engine shaft, the controller being configured to control the motor to add additional motor power to the engine power generated by the engine when at least one of the plural cylinders is deactivated and a required power to be generated by the engine system is larger than a product of a predetermined coefficient and a running power to move the vehicle on a flat road with a constant velocity.

12. An engine system according to claim 11, wherein the predetermined coefficient is at least 0 and at most 10.

13. An engine system according to claim 1, wherein the controller is configured to control the engine to increase the number of activated cylinders when required engine power to be generated by the engine is larger than a first threshold engine power and to decrease the number of activated cylinders when the required engine power is smaller than a second threshold engine power.

14. An engine system according to claim 13, wherein the first threshold engine power is equal to the second threshold engine power.

15. An engine system according to claim 14, wherein the controller is configured to control the engine to decrease the number of activated cylinders only after the engine is controlled to maintain the number of activated cylinders for the predetermined period of time.

16. An engine system according to claim 13, wherein the controller is configured to control the engine to activate all of the plural cylinders when the engine speed is lower than a threshold engine speed, a coolant temperature is lower than a predetermined temperature, misfire is detected, or a change rate in engine speed is larger than a predetermined rate, even when the required engine power is smaller than the second threshold engine power.

17. An engine system according to claim 13, wherein the controller is configured to control the engine to maintain the number of the activated cylinders when a difference between a target engine speed and an actual engine speed is larger than a predetermined value even when the required engine power is larger than the first threshold engine power or smaller than the second threshold engine power, and wherein the controller is configured to control the transmission to change the transmission ratio in order that the actual engine speed is equal to the target engine speed.

18. An engine system according to claim 13, wherein the second threshold engine power is smaller than the first threshold engine power.

19. An engine system comprising:
an engine which has an engine shaft and plural cylinders and in which a number of activated cylinders among the plural cylinders is variable;
transmission means for transmitting a rotation of the engine shaft to wheels of a vehicle at a transmission ratio which is continuously variable; and
controlling means for controlling the engine to change the number of activated cylinders keeping an engine power generated by the engine to be substantially constant.

20. A method for controlling an engine system, comprising:
transmitting a rotation of an engine shaft of an engine to wheels of a vehicle at a transmission ratio which is continuously variable; and
controlling the engine to change a number of activated cylinders keeping an engine power generated by the engine to be substantially constant.

21. A vehicle comprising:
an engine which has an engine shaft and plural cylinders and in which a number of activated cylinders among the plural cylinders is variable;
a continuously variable transmission configured to transmit a rotation of the engine shaft to wheels of a vehicle at a transmission ratio which is continuously variable; and
a controller configured to control the engine to change the number of activated cylinders keeping an engine power generated by the engine to be substantially constant.

* * * * *